(12) United States Patent
Sato

(10) Patent No.: US 6,952,343 B2
(45) Date of Patent: Oct. 4, 2005

(54) FUNCTIONAL EXPANSION APPARATUS AND METHOD FOR ATTACHING ELECTRONIC APPARATUS TO THE FUNCTIONAL EXPANSION APPARATUS

(75) Inventor: Masahiko Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/452,745

(22) Filed: Jun. 2, 2003

(65) Prior Publication Data

US 2003/0227746 A1 Dec. 11, 2003

(30) Foreign Application Priority Data

Jun. 11, 2002 (JP) .......................................... 2002-170714
Jun. 11, 2002 (JP) .......................................... 2002-170718

(51) Int. Cl.[7] ................................................. G06F 1/16
(52) U.S. Cl. ........................ 361/686; 361/679; 361/683
(58) Field of Search ................................. 361/679–681, 361/683, 686

(56) References Cited

U.S. PATENT DOCUMENTS 5,583,529 A * 12/1996 Satou ............................ 345/87
6,034,869 A * 3/2000 Lin .............................. 361/686
6,142,593 A * 11/2000 Kim et al. ................. 312/223.2
6,264,488 B1 * 7/2001 Helot et al. .................. 439/341
6,788,527 B2 * 9/2004 Doczy et al. ................ 361/680

FOREIGN PATENT DOCUMENTS

| JP | 9-282048 | 10/1997 |
| JP | 10-091290 | 4/1998 |
| JP | 2001-067141 | 3/2001 |

* cited by examiner

*Primary Examiner*—Yean-Hsi Chang
(74) *Attorney, Agent, or Firm*—Greer, Burns & Crain, Ltd.

(57) ABSTRACT

A functional expansion apparatus for connecting an electronic apparatus having a first connector, to an external apparatus that expands a function of the electronic apparatus includes a frame movable between a first position and a second position, a connector cover including a second connector connectible to the first connector, the connector cover moving with the frame so that the first and second connectors are connected to each other when the frame is located at the first position, and the first and second connectors are disconnected from each other when the frame is located at the second position, and a lock part for locking the electronic apparatus when the frame is located at the first position, and for unlocking the electronic apparatus when the frame is located at the second position.

7 Claims, 25 Drawing Sheets

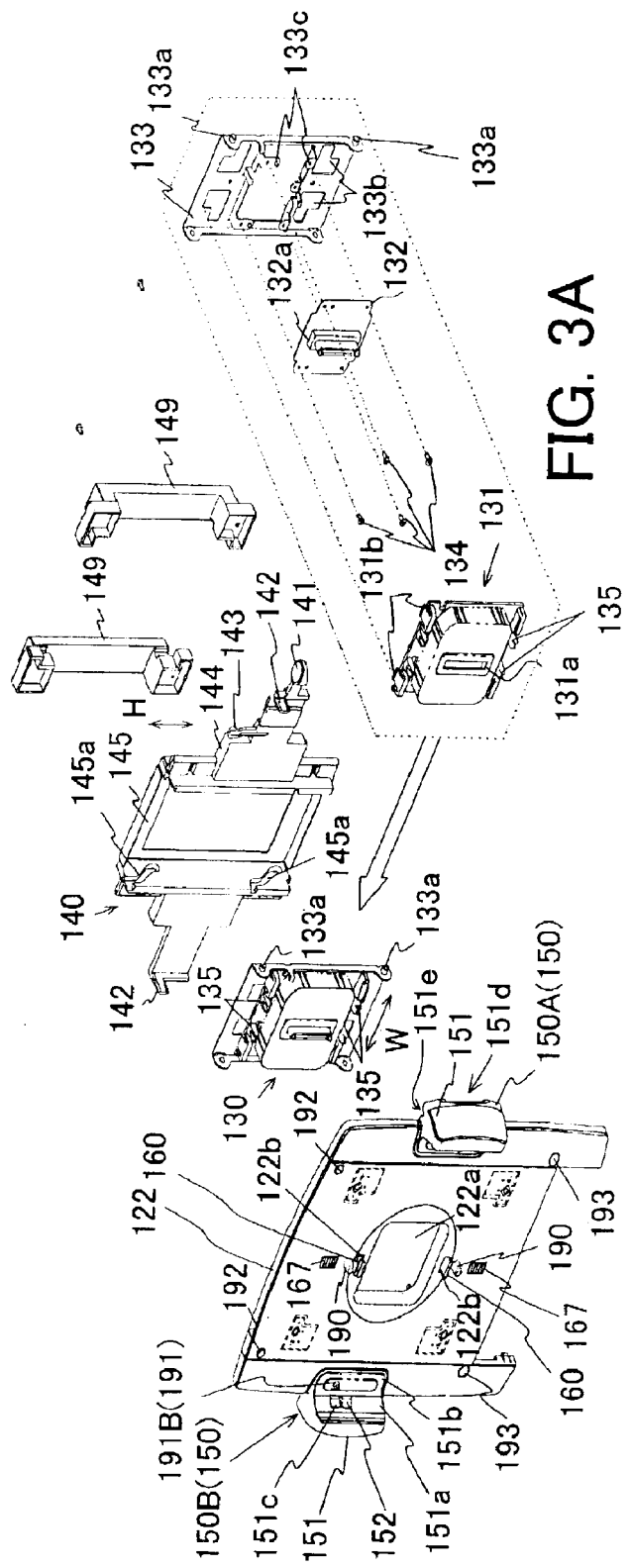

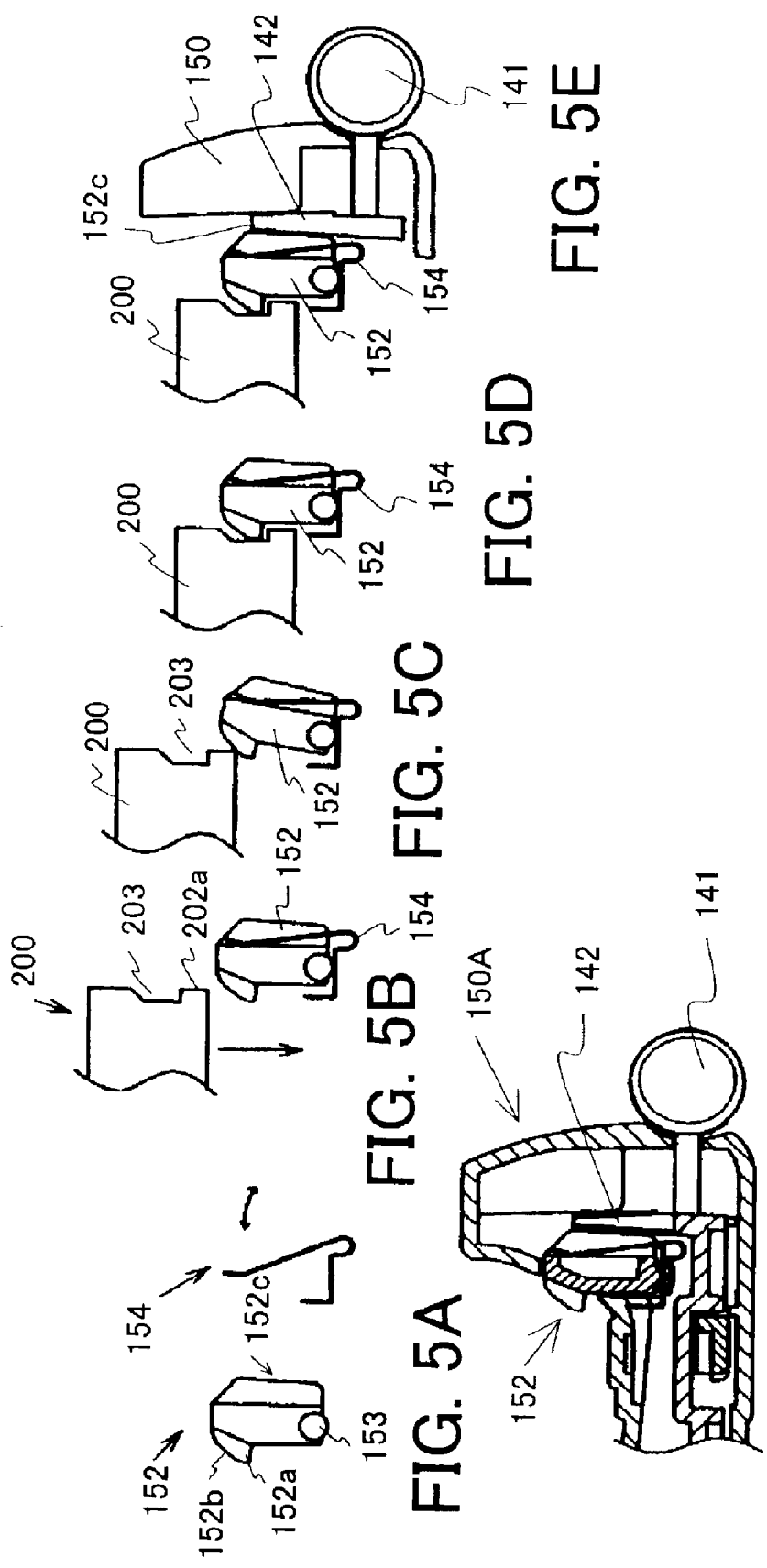

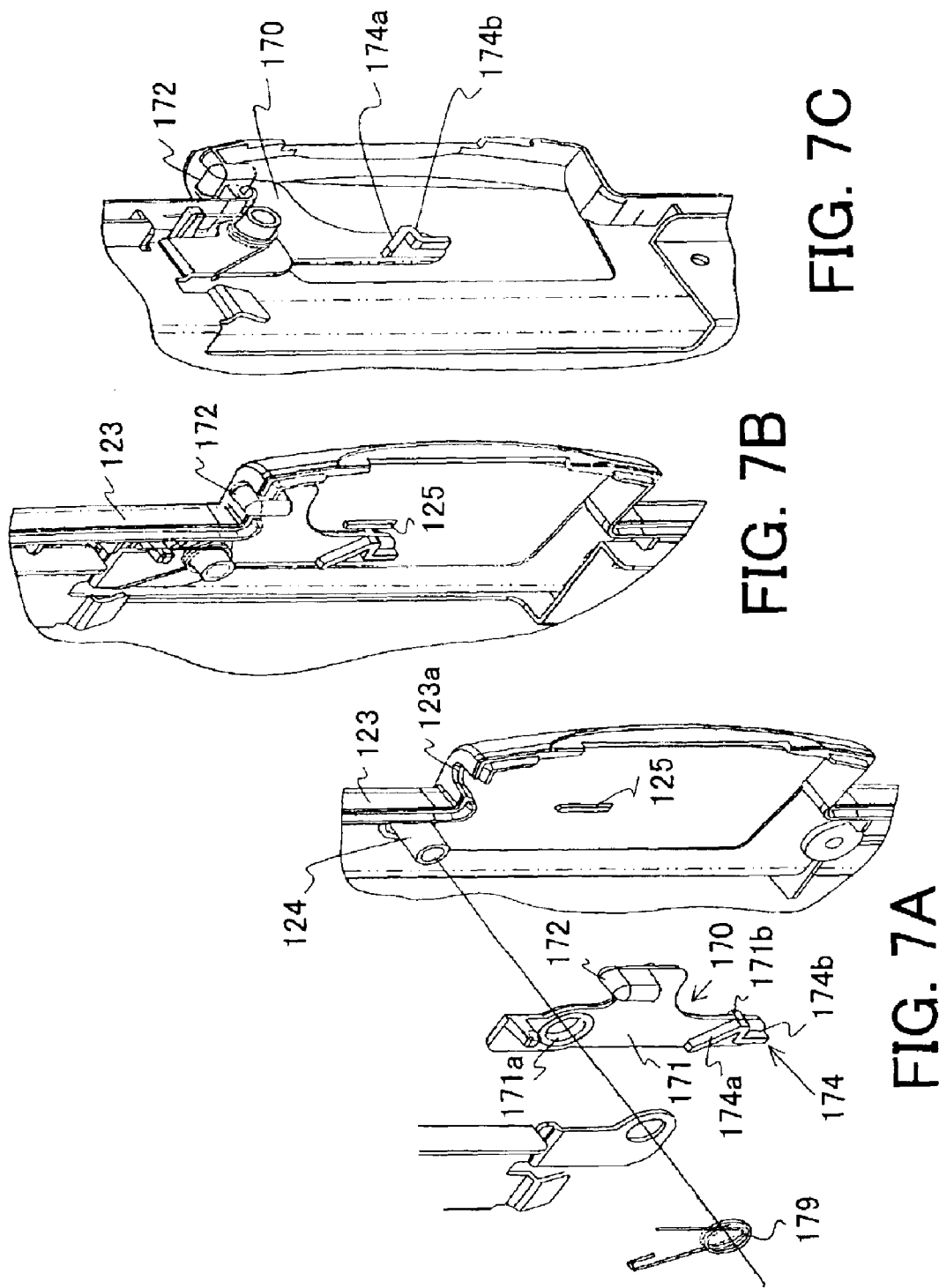

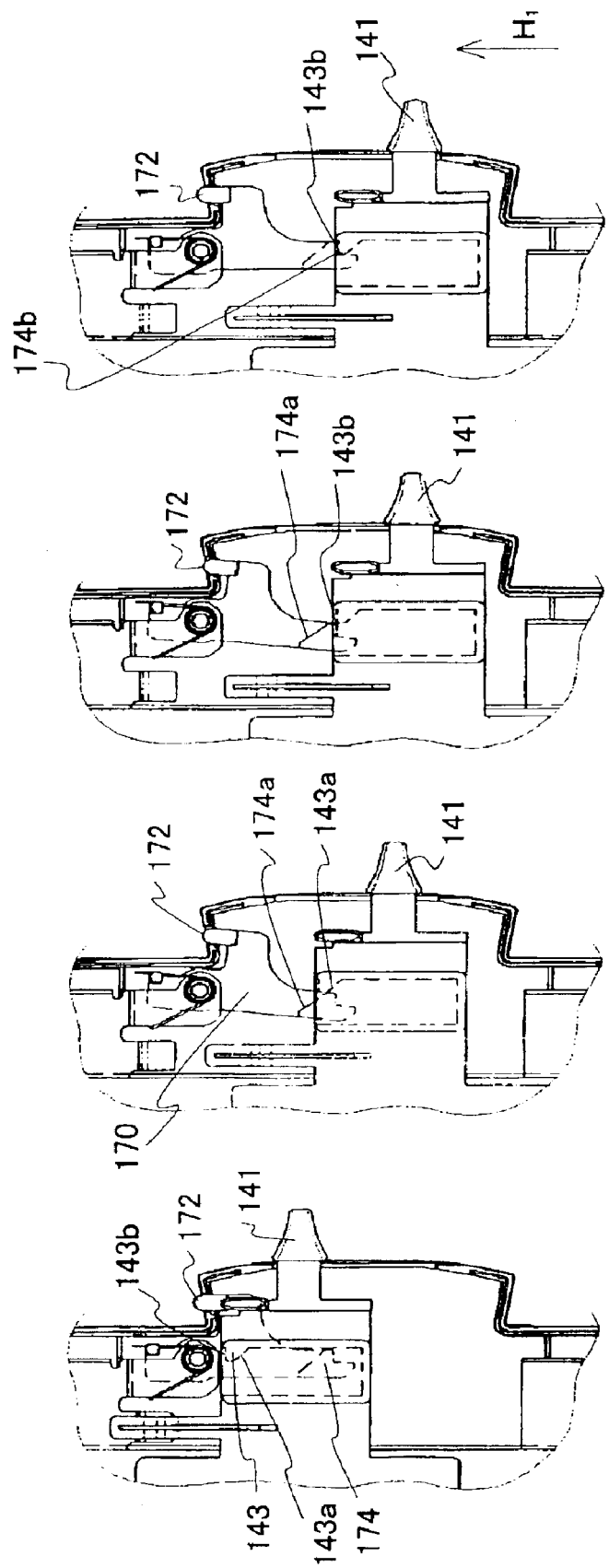

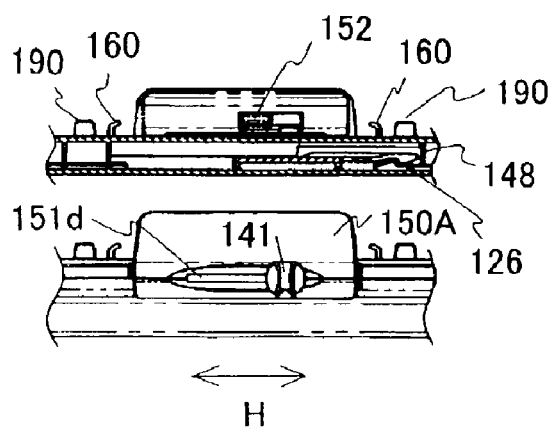
FIG. 9A
FIG. 9B
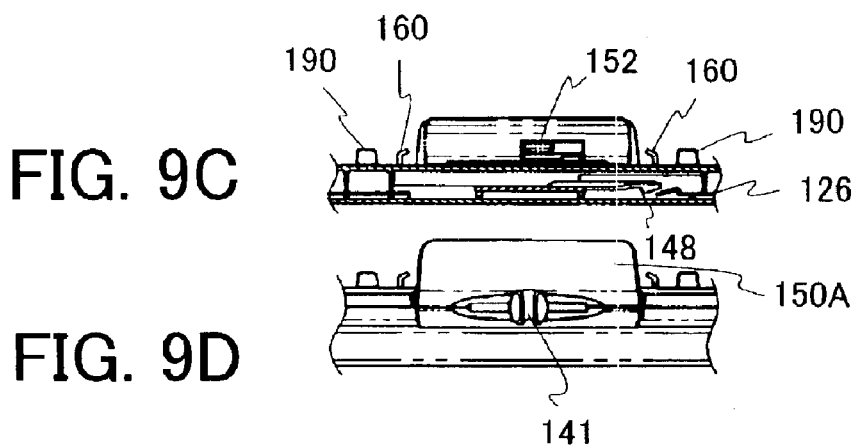
FIG. 9C
FIG. 9D
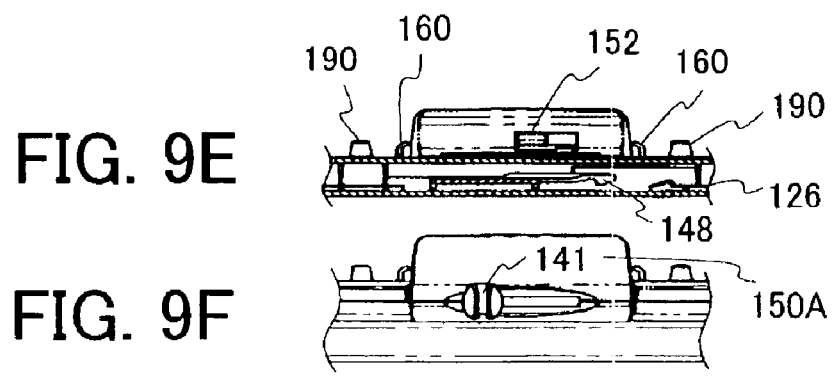
FIG. 9E
FIG. 9F

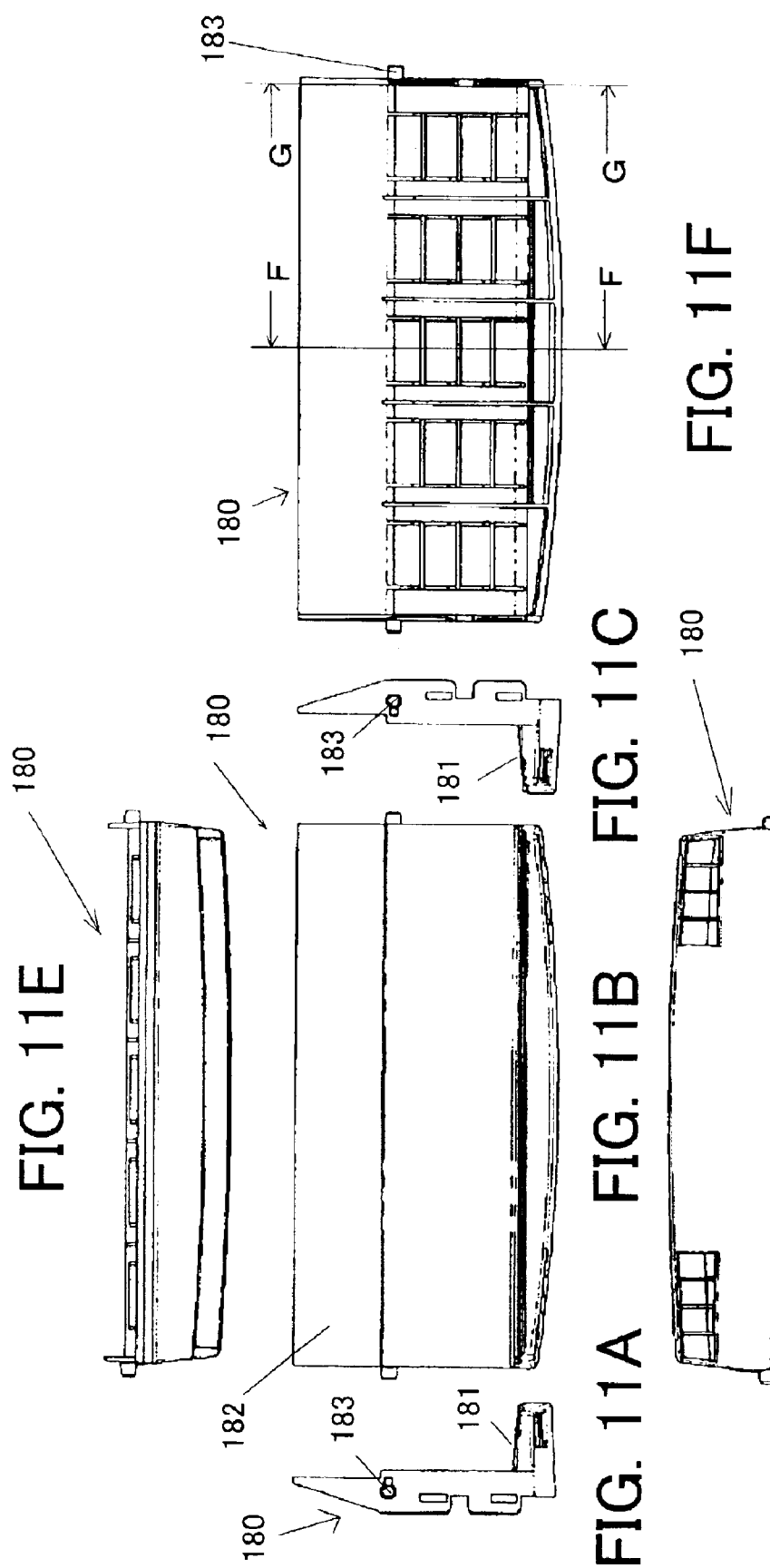

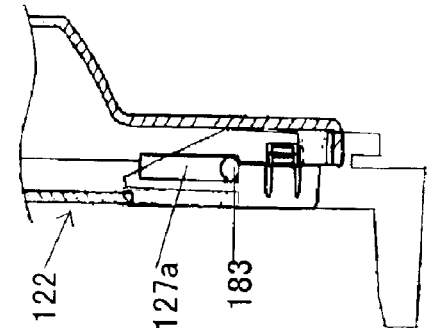
FIG. 13A
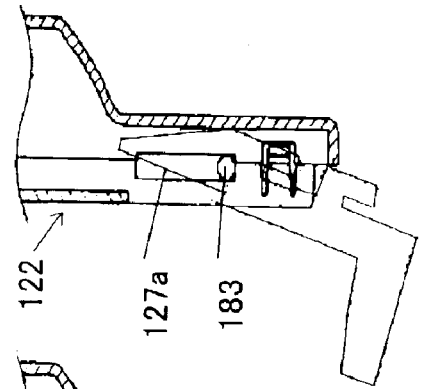
FIG. 13B
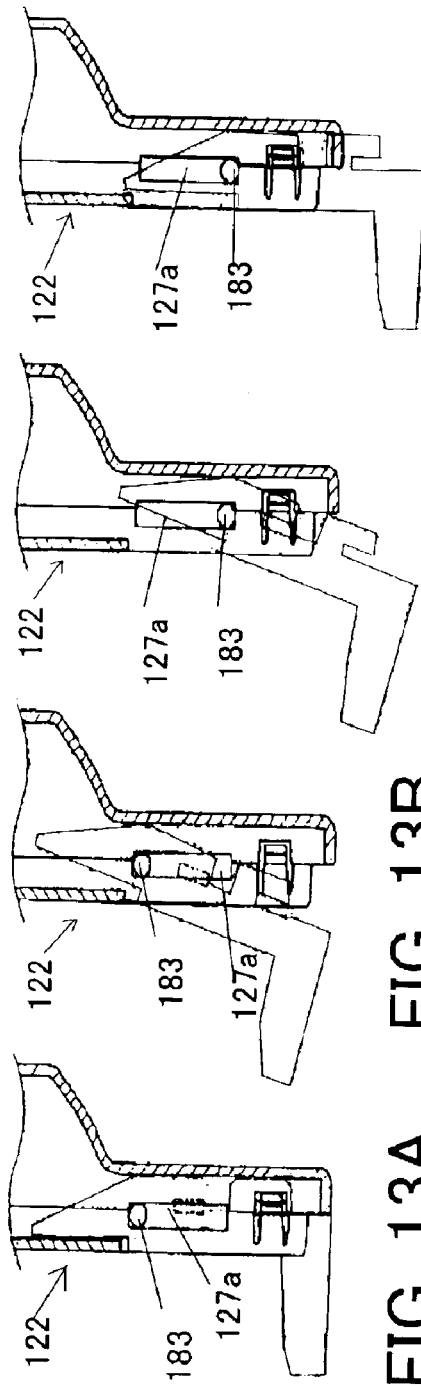
FIG. 13C
FIG. 13D
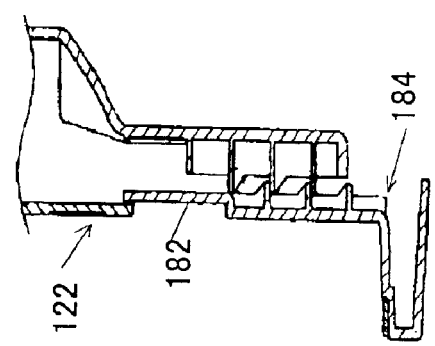
FIG. 13E
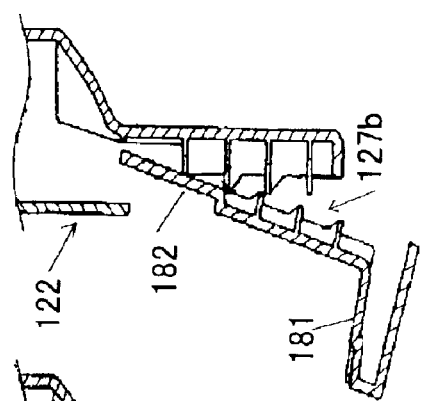
FIG. 13F
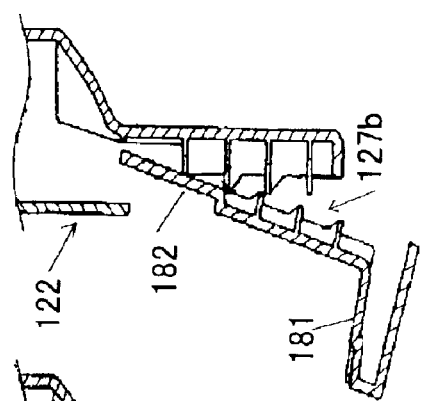
FIG. 13G
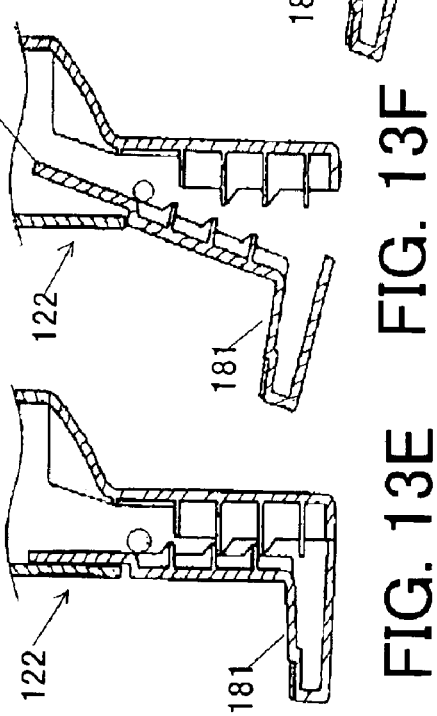
FIG. 13H

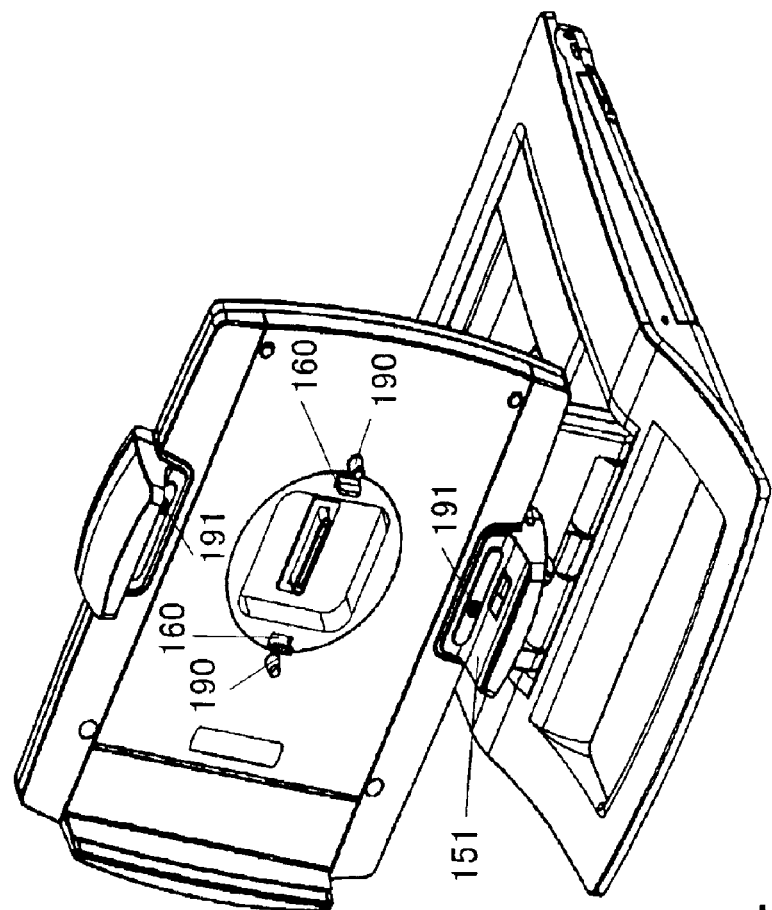
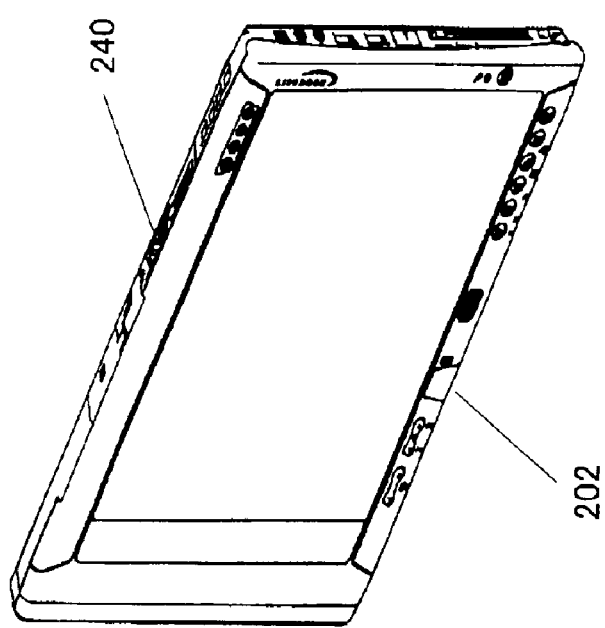
FIG. 14

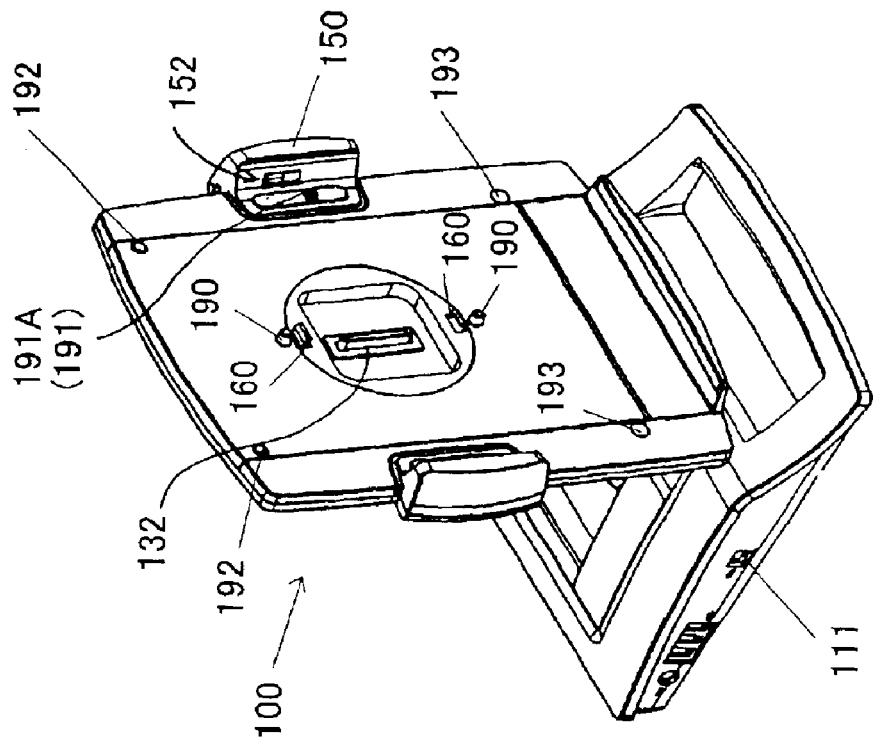
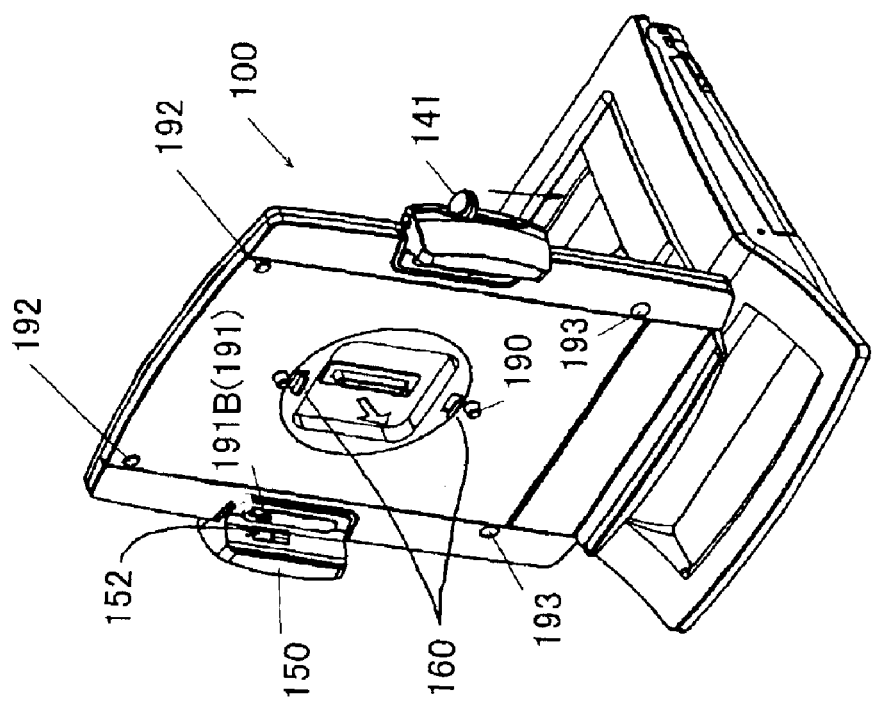

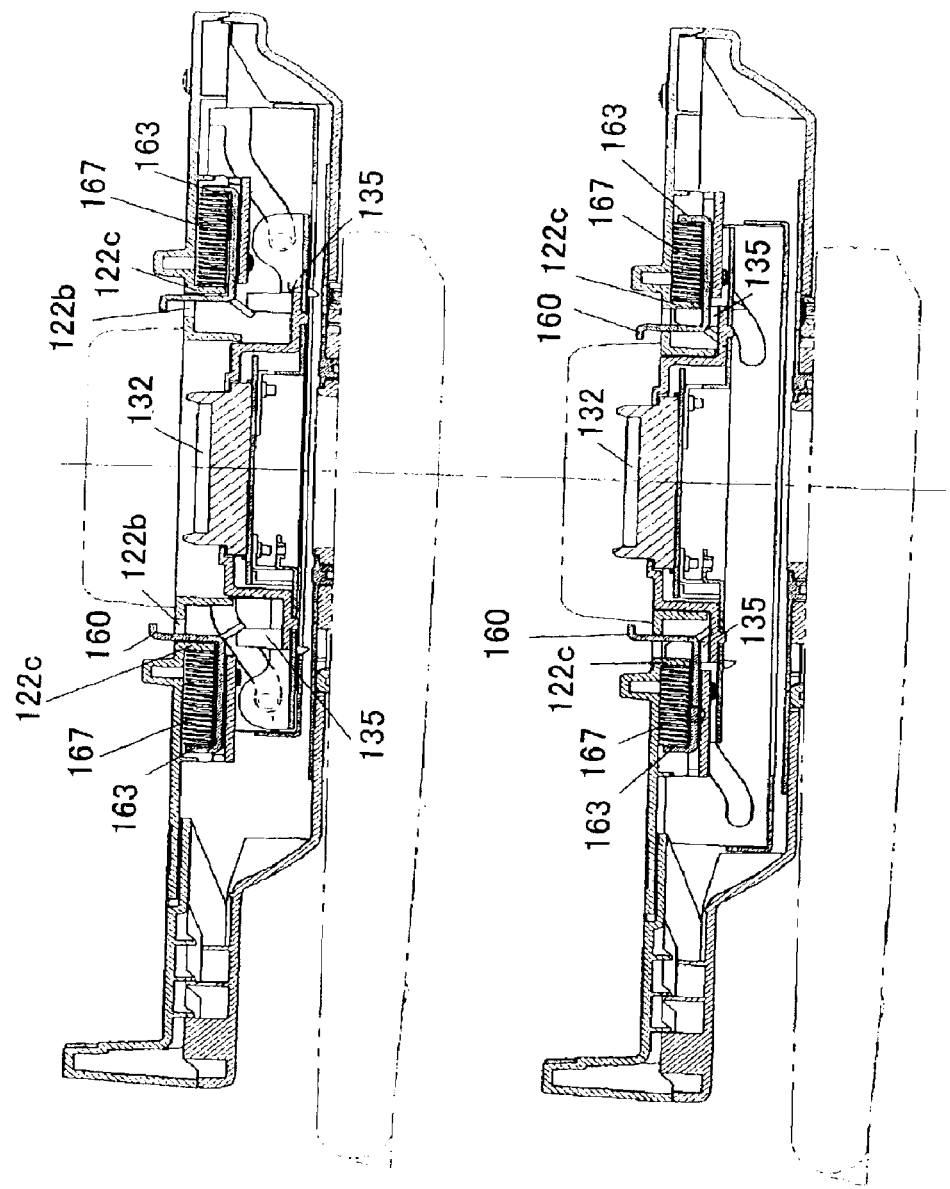

FUNCTIONAL EXPANSION APPARATUS AND METHOD FOR ATTACHING ELECTRONIC APPARATUS TO THE FUNCTIONAL EXPANSION APPARATUS

BACKGROUND OF THE INVENTION

The present invention relates generally to peripherals of electronic apparatuses, such as laptop personal computers ("notebook PCs"), portable terminals, personal digital assistants ("PDAs"), and more particularly to a functional expansion unit for use with the electronic apparatus or hardware. The "peripheral", as used herein, is such hardware as is connectable with a PC body and realizes a necessary function. The "functional expansion unit" is an interface device for expanding a function of the electronic apparatus, such as a docking station, a docking bay (device), and an expansion bay (device). The present invention is suitable, for example, for a docking station. The "docking station", as used herein, is an interface device that is connected, for example, to a laptop PC, etc. when the laptop PC is used not outside but on a desk in his office, etc., so as to make available a certain function that is otherwise unavailable in the laptop PC.

The recent development and spread of laptop PCs, portable terminals and portable electronic apparatuses have increasingly demanded compact and lightweight electronic apparatuses for portability purposes which nevertheless exhibit such affluent functions on a desk in an office as a desktop PC. For example, a pen note type PC has such an A4 size, for example, that it enables a user to enter information using a pen without a keyboard, and has a thin, small and lightweight body for portability purposes. In addition, the pen note type PC is connected to a docking station in an office and thus connectible to an FDD, CRT, LAN, USB, etc.

A description will now be given of a fixture between a conventional pen note type PC 10 and a docking station 20, with reference to FIG. 22. Here, FIG. 22 is a perspective overview for explaining a fixture between the conventional pen note type PC body 10 and the docking station 20. The pen note type PC body 10 includes a connector 11, a pair of side surfaces 12, a front surface 14, and a rear surface 15. The docking station 20 includes a PC fixing part 20A for fixing the PC body 10, and a base 20B. The PC fixing part 20A includes a connector 21, a pair of rails 22, a pair of guides 24, and a front cover 25. The PC body 10 slides on the pair of rails 22 through its rear surface 15, and the side surfaces 12 are guided by the pair of guides 24. Its connector 11 is connected to the connector 21, and the front surface 14 is guided by the front cover 25.

However, the structure shown in FIG. 22 has a disadvantage in that the PC body 10 slides on the PC fixing part 20A in the docking station 20 for connection with the docking station 20, and thus the side surfaces 12, front surface 14, and rear surface 15 on the PC body 10 are subject to scratches due to contacts with the guides 24, front cover 25 and rails 22, and are unsuitable for ornaments including coating.

An attempt to improve display convenience has recently been proposed by enabling the PC body 10 to rotate by 90 degrees after the PC body 10 is attached to the docking station 20. Such a configuration is convenience, for example, because the entire A4-sized document may be displayed on one screen. This structure may be realized by making the PC fixing part 20A in the docking station 20 rotatable relative to the base 20B. However, this configuration requires the rotary axis to be arranged at a position indicated by an alternate long and short dash line in FIG. 23, thus requiring a long cable as shown by broken line susceptible to noises and crosstalks, and increasing costs.

In addition, while the configuration shown in FIG. 23 facilitates the connection of the PC body 10 to the PC fixing part 20A from the top, it has bad operability in attaching the PC body 10 from the side after the PC fixing part 20A has been rotated by 90 degrees. This is because the PC body 10 should slide on the PC fixing part 20A.

BRIEF SUMMARY OF THE INVENTION

Accordingly, it is an exemplary object of the present invention to provide a functional expansion apparatus that is adapted to rotate, realizes an easy detachable attachment of an electronic apparatus to the functional expansion apparatus without damaging the electronic apparatus, and maintains a stable connection without damaging connectors in both apparatuses, as well as a method for attaching the electronic apparatus to the functional expansion apparatus.

Another object of the present invention is to provide a functional expansion apparatus that enables the electronic apparatus to be used rotatably with a shorter cable.

In order to achieve these and other objects, a functional expansion apparatus of one aspect of the present invention for connecting an electronic apparatus having a first connector, to an external apparatus that expands a function of the electronic apparatus, includes a frame movable between a first position and a second position, a connector cover including a second connector connectible to the first connector, the connector cover moving with the frame so that the first and second connectors are connected to each other when the frame is located at the first position, and the first and second connectors are disconnected from each other when the frame is locate at the second position, and a lock part for locking the electronic apparatus when the frame is located at the first position, and for unlocking the electronic apparatus when the frame is located at the second position. This functional expansion apparatus locks the electronic apparatus when the frame is located at the first position, a load applicable to the first and second connectors may be small.

The lock part may include a provisional lock that is adapted to be movable between a third position and a fourth position, and engaged with the electronic apparatus when located at the third position, a forcing member for forcing the provisional lock to the third position; and a fixing member, movable with the frame, for locking the provisional lock at the third position when the frame is located at the first position, and unlocking the provisional lock when the frame is located at the second position. According to this functional expansion apparatus, since the forcing member forces so that the provisional lock is engaged with the electronic apparatus to provisionally fix the electronic apparatus even before the electronic apparatus, the electronic apparatus is fixed to some extent before the frame moves to the first position.

Alternatively, the lock part may include a claw movable with the frame and engaged with the electronic apparatus when the frame is located at the first position; and a lock mechanism for locking the frame at the first position, wherein the lock mechanism includes a first engagement part engageable with the frame, a second engagement part provided on the frame and engageable with the first engagement part, and a forcing member for forcing the first engagement part in a direction that allows the first engagement part to be engaged with the second engagement part on the frame when the frame has moved to the first position.

According to this functional expansion apparatus, the claw is engaged with the electronic apparatus when the frame is located at the first position, and the claw locks the electronic apparatus since the frame is locked at the first position. The functional expansion apparatus may further include a unlock mechanism, e.g., an unlock button for releasing a lock by the lock mechanism by moving the first engagement part against a force by the forcing member. According to this functional expansion apparatus, a user may move the frame from the first position to the second position by activating the unlock mechanism.

The frame may have a groove for moving the connector cover close to and apart from the electronic apparatus, and the connector cover may have a projection that moves along the groove. This functional expansion apparatus has such a simple structure that the connector cover may move in a position where the connector does not get damaged when the connector is not to be connected. The functional expansion apparatus may further include a housing for accommodating the frame, wherein the connector cover exposes the second connector from the housing when the frame is located at the first position, and the connector cover accommodates the second connector in the housing when the frame is located at the second position. An accommodation of the connector in the housing would prevent the connector from getting damaged.

The functional expansion apparatus may further include a holding mechanism for holding the frame at the second position. Thereby, the frame is prevented from moving due to the gravity, etc. The holding mechanism may include a first engagement part fixed relative to the frame, and a second engagement part provided on the frame and detachably engaged with the first engagement part. The first and second engagement parts may be connected, for example, elastically.

The functional expansion apparatus may further include a housing for accommodating the frame, the housing having an opening through which the connector cover projects and retreats, and a first positioning member, provided around the opening and engageable with the electronic apparatus, for positioning the electronic apparatus. This functional expansion apparatus provides the first positioning member near the connector, thereby positioning the connector and its vicinity with precision. The functional expansion apparatus may further include a pair of side guides, provided around the opening, for holding a pair of side surfaces of the electronic apparatus, and a second positioning member, provided on each side guide and engageable with the electronic apparatus, for positioning the electronic apparatus. Thereby, the connector and its vicinity may be positioned with higher precision. For example, it is preferable to arrange a pair of first positioning members symmetrical with respect to the opening, and a straight line for connecting the pair of first positioning members orthogonal to a straight line for connecting a pair of second positioning members. This is because this may position the vicinity of the connector two-dimensionally. The side guide may be used to mount and incline the electronic apparatus when the electronic apparatus is to be attached to the functional expansion apparatus, thereby improving the convenience of the attachment of the electronic device.

The functional expansion apparatus may further include a spacer member for maintaining a distance between the electronic apparatus and the functional expansion apparatus, thereby surely preventing the first and second connectors from incurring an overload.

Preferably, the electronic apparatus has a LAN connector, and the functional expansion apparatus further includes a shield member for covering the LAN connector when the electronic apparatus is attached to the functional expansion apparatus. Thereby, a network device, such as a hub and a router, misconceives the functional expansion apparatus to which the electronic apparatus has been attached, to be two terminals erroneously. The above side guide may have this function.

The above functional expansion apparatus may further include a base connectible to the external apparatus, and an electronic-apparatus fixing part for fixing the electronic apparatus, the electronic-apparatus fixing part being adapted to be rotatable around the connector cover relative to the base.

A method of another aspect of the present invention for attaching an electronic apparatus having a first connector to a functional expansion apparatus for connecting the electronic apparatus to an external apparatus that expands a function of the electronic apparatus, the functional expansion apparatus including a connector cover having a second connector connectible to the first connector, a housing having an opening through which the connector cover projects and retreats, and a positioning member, engaged with the electronic apparatus, for positioning the electronic apparatus includes the steps of engaging the positioning member with the electronic apparatus, and connecting the first connector to the second connector after the engaging step. According to this method, the electronic apparatus and the functional expansion apparatus are positioned relative to each other near the connectors before the first and second connectors are connected. Therefore, both connectors incur a small load and are prevented from getting damaged.

The functional expansion apparatus may further include a frame movable between a first position and a second position, a claw movable with the frame and engaged with the electronic apparatus when the frame is located at the first position; and a lock mechanism for locking the frame at the first position, wherein the lock mechanism includes a first engagement part engageable with the frame, a second engagement part provided on the frame and engageable with the first engagement part, and a forcing member for forcing the first engagement part in a direction that allows the first engagement part to be engaged with the second engagement part on the frame when the frame has moved to the first position, and wherein the method further comprises, between the engaging step and the connecting step, the step of locking the frame at the first position through the lock mechanism and engaging the claw with the electronic apparatus. The claw is engaged with the electronic apparatus and the lock mechanism locks the frame before the first and second connectors are connected to each other. As a result, the electronic apparatus is locked, and the first and second connectors incur a smaller load and are prevented from getting damaged more securely.

The functional expansion apparatus may further include a frame movable between a first position and a second position, and a lock mechanism for locking the electronic apparatus when the frame is located at the first position, and holding the electronic apparatus movably when the frame is located at the second position, and wherein the method further comprises, between the engaging step and the connecting step, the step of holding the electronic apparatus movably. The electronic apparatus is held movably (or provisionally locked as described later) before the first and second connectors are connected to each other, the electronic apparatus may be positioned with precision and both connectors are prevented from getting damaged more securely. The method may further include the step of locking the electronic apparatus after the connecting step. The (real) lock of the electronic apparatus after both connectors are connected may make the load applied to both connectors small and prevent the connectors from getting damaged.

A functional expansion apparatus of another aspect of the present invention for connecting an electronic apparatus having a first connector, to an external apparatus that expands a function of the electronic apparatus includes a base connectible with the external apparatus, and an electronic-apparatus fixing part that is connectible to the electronic apparatus, and includes a second connector connectible to the first connector, the electronic-apparatus fixing part being coupled to the base rotatable around the second connector. According to this functional expansion apparatus, the electronic-apparatus fixing part rotates relative to the base, and rotary axes between the second connector and the electronic-apparatus fixing part approximately accord with each other. Thereby, the cable may be made short.

The electronic-apparatus fixing part includes a housing to which the electronic apparatus is attached, a stopper formed on the housing, and an approximately annular friction plate that is fixed onto the housing and has plural elastically deformable first projections, and wherein the base includes a second projection that contacts the stopper and restricts a movement of the stopper, the second projection having a concave part engageable with the first projection, and a stand onto which the second projection is fixed, the stand being fixed rotatably onto the friction plate. Thereby, the electronic-apparatus fixing part may be made rotatable relative to the base. The friction plate may have a hollow part, through which a cable for connecting the second connector and the base to each other passes. This structure may shorten the cable.

The stopper may include three first stoppers that are annularly arranged at an interval of 120 degrees, and three second stoppers that are annularly arranged at an interval of 120 degrees, wherein the first and second stoppers are offset by 90 degrees. Thereby, the electronic-apparatus fixing pat may be made rotatable relative to the base, for example, by an angle of 90 degrees.

A functional expansion apparatus of another aspect of the present invention for connecting an electronic apparatus having a first connector, to an external apparatus that expands a function of the electronic apparatus includes a housing to which the electronic apparatus is attached, a guide for enabling the electronic apparatus to be attached to the housing by mounting the electronic apparatus and allowing the electronic apparatus to fall toward the housing, and a second connector, provided on a surface on the housing toward which the electronic apparatus falls, the second connector being connectible with the first connector. This functional expansion apparatus improves operability in attachment and separation, since the electronic apparatus may be attached to the functional expansion apparatus by mounting the electronic apparatus on the guide and engage the electronic apparatus with the housing instead of sliding on the functional expansion apparatus as seen in the prior art. Such a guide guides, for example, a bottom surface and a side surface of the electronic apparatus.

The functional expansion apparatus may further include a base connectible to the external apparatus, and an electronic-apparatus fixing part that includes the guide and the second connector, the electronic apparatus fixing part being coupled to the base rotatable around the second connector. Thereby, the electronic apparatus may be attached to the electronic-apparatus fixing part that may rotate relative to the base. The guide guide, movable between first and second positions, may guide a first electronic apparatus when the guide is located at the first position, and guide a second electronic apparatus different in length from the first electronic apparatus when the guide is located at the second position. This guide enables electronic apparatuses different in length to be attached to the functional expansion apparatus. The electronic apparatuses different in length have, for example, battery parts different in length. The housing may include an opening through which the second connector projects and retreats, wherein the guide is provided so as to enclose the opening, the guide being one of a pair of side guides for holding a pair of side surfaces of the electronic apparatus. An enclosure of the opening may prevent the electronic apparatus from shaking, and reduce the load applied to the connector. This functional expansion apparatus corresponds to an attachment that rotates the electronic apparatus in attaching the same.

A functional expansion apparatus of still another aspect of the present invention for connecting first and second electronic apparatus having different lengths, to an external apparatus for expanding a function of the electronic apparatus includes guide, movable between first and second positions and used to mount and incline the electronic apparatus in an attempt to attach the electronic apparatus to the functional expansion apparatus, the guide guiding the first electronic apparatus when the guide is located at the first position, and guiding the second electronic apparatus when the guide is located at the second position, and a holding part for holding the guide at the first and second positions. According to this functional expansion apparatus, the guide enables electronic apparatuses different in length to be attached to the functional expansion apparatus. The electronic apparatuses different in length have, for example, battery parts different in length.

Other objects and further features of the present invention will become readily apparent from the following description of the embodiments with reference to accompanying drawings.

BRIEF DESCRIPTION OF THE DRAWINGS

FIGS. 1A and 1B are perspective overviews of a docking station of a typical example of an inventive functional expansion apparatus to which a pen note type body has been attached, wherein FIG. 1A shows the PC body used vertically, and FIG. 1B shows the PC body used laterally.

FIG. 3A is an exploded perspective view of a housing of the PC fixing part, a connector elevator mechanism and a connector cover in the docking station shown in FIG. 1, and FIG. 3B is a partial sectional view for explaining an elevation of the contact cover shown in FIG. 3A.

FIGS. 5A–5F are sectional views showing a structure and operation of a provisional lock used for the docking station shown in FIG. 1.

FIGS. 7A–7C are perspective views for explaining a mechanism for locking the frame shown in FIG. 3 at a lock position.

FIGS. 8A–8D are partially transparent plane views for explaining an operation of the mechanism shown in FIG. 7 for locking the frame shown in FIG. 3 at the lock position.

FIGS. 9A–9F are partial sectional views and partial side views for explaining a movement of the frame and a mechanism that detains a claw, a lock lever, and the frame at unlock positions.

FIGS. 11A–11F are views of a structure of a guide used for the docking station shown in FIG. 1.

FIGS. 13A–13H are sectional views for explaining the guide shown in FIG. 12 being attached to the docking station at a different position.

FIG. 14 is an exploded perspective view showing the PC body being attached to the PC fixing part as shown in FIG. 1B.

FIGS. 16A and 16B are perspective views of the docking station shown in FIG. 1 viewed from different angles.

FIGS. 25A and 25B are sectional views for explaining the operation of the lock mechanism shown in FIG. 24, wherein FIG. 25A shows the frame shown in FIG. 3 located at the unlock position, and FIG. 25B shows the frame shown in FIG. 3 located at the lock position.

DETAILED DESCRIPTION OF THE INVENTION

Figure 1B:
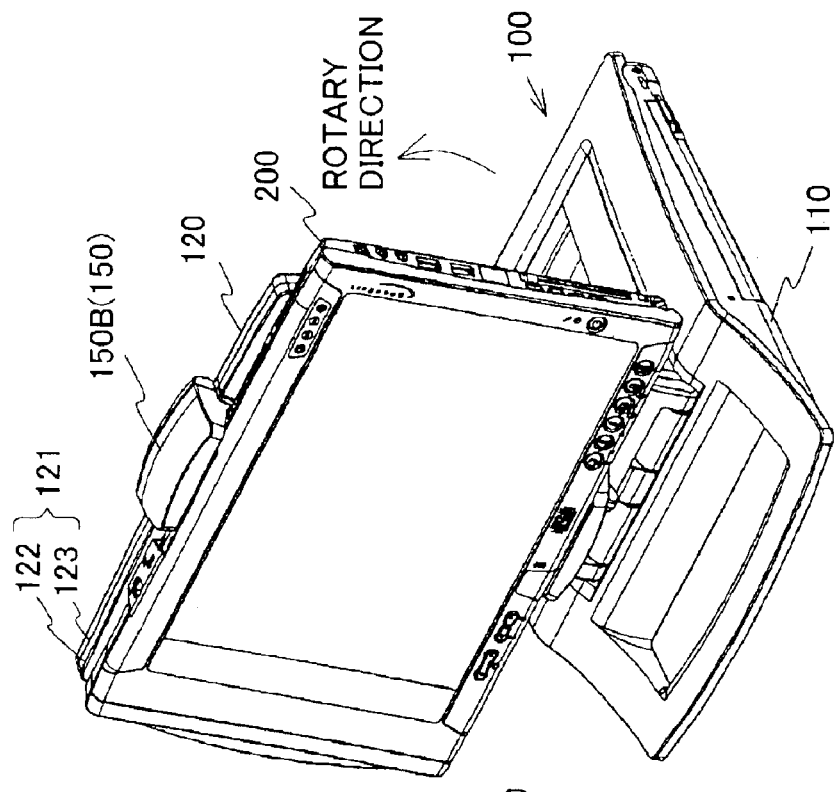
Figure 1A:
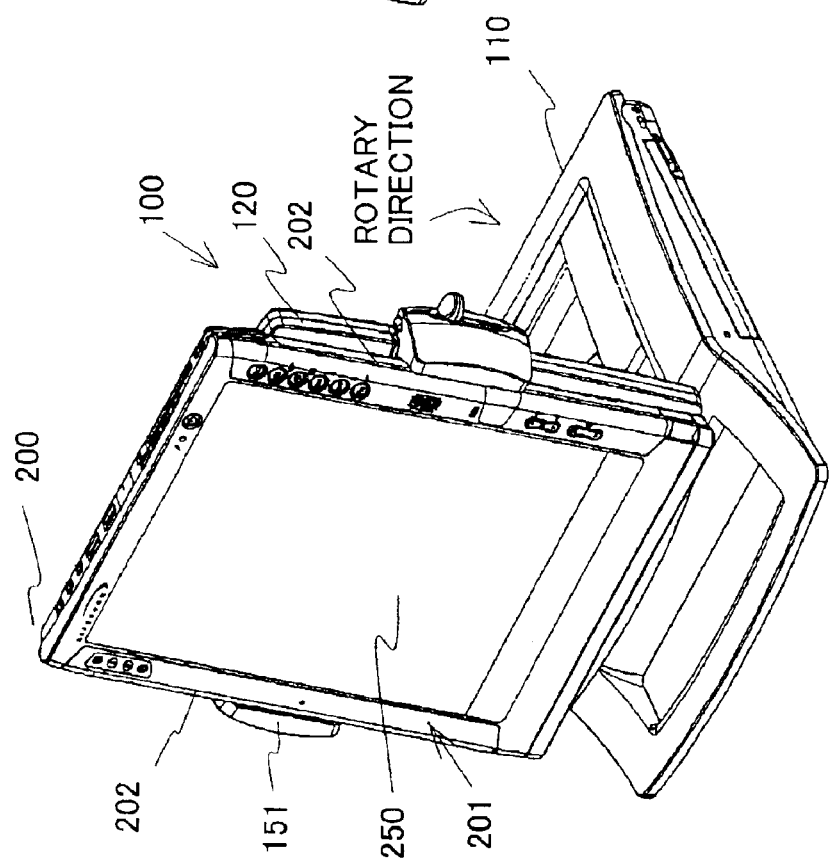
Figure 2:
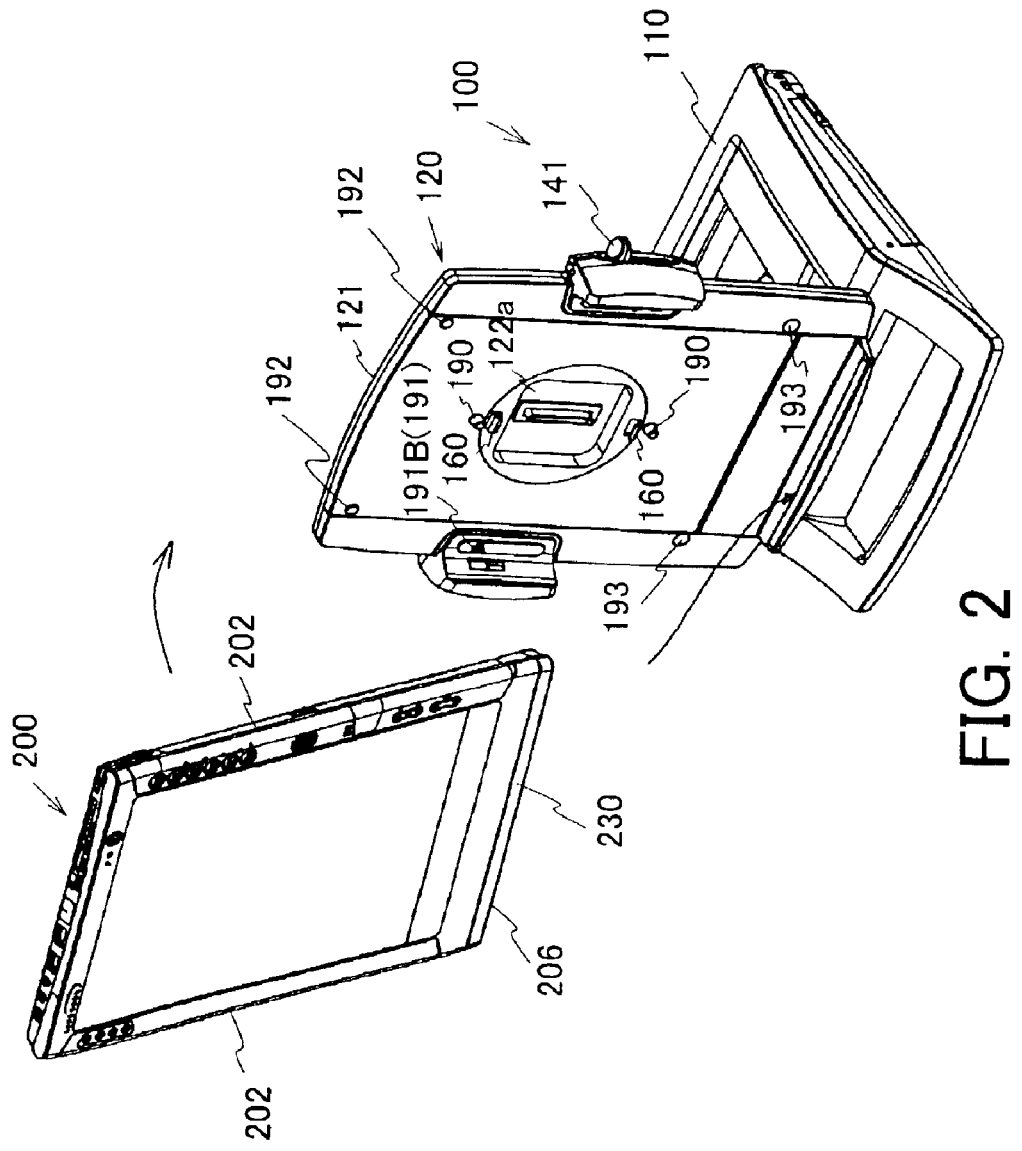
FIG. 2 is an exploded perspective view in attaching the PC body to the PC fixing part as shown in FIG. 1A.

Referring now to accompanying drawings, a description will be given of a docking station 100 of one embodiment according to the present invention. Here, FIG. 1 is a perspective overview of the docking station 100 to which a pen note type PC body 200 is attached, wherein FIG. 1A shows the PC body 200 used as a vertical type or vertically, and FIG. 1B shows the PC body 200 used as a lateral type or laterally. The docking station 100 includes a port replicator, and serves as a functional expansion apparatus having an interface for connecting the PC body 200 to an external apparatus, such as an FDD, a CRT, a LAN, and a USB. FIG. 2 is an exploded perspective view in attaching the PC body 200 to the PC fixing part 120 as shown in FIG. 1A.

The docking station 100 includes a base 110 and a PC fixing part 120 that is made rotatable around the base 110.

The base 110 includes connectors with other external apparatuses, such as the FDD, CRT, LAN and USB.

The PC fixing part 120 serves to fix the PC body 200, and includes a connector elevator mechanism and a lock mechanism in a housing 121. The housing 121 includes an upper cover 122 and a lower cover 123, as shown in FIG. 1B.

Figure 4A:
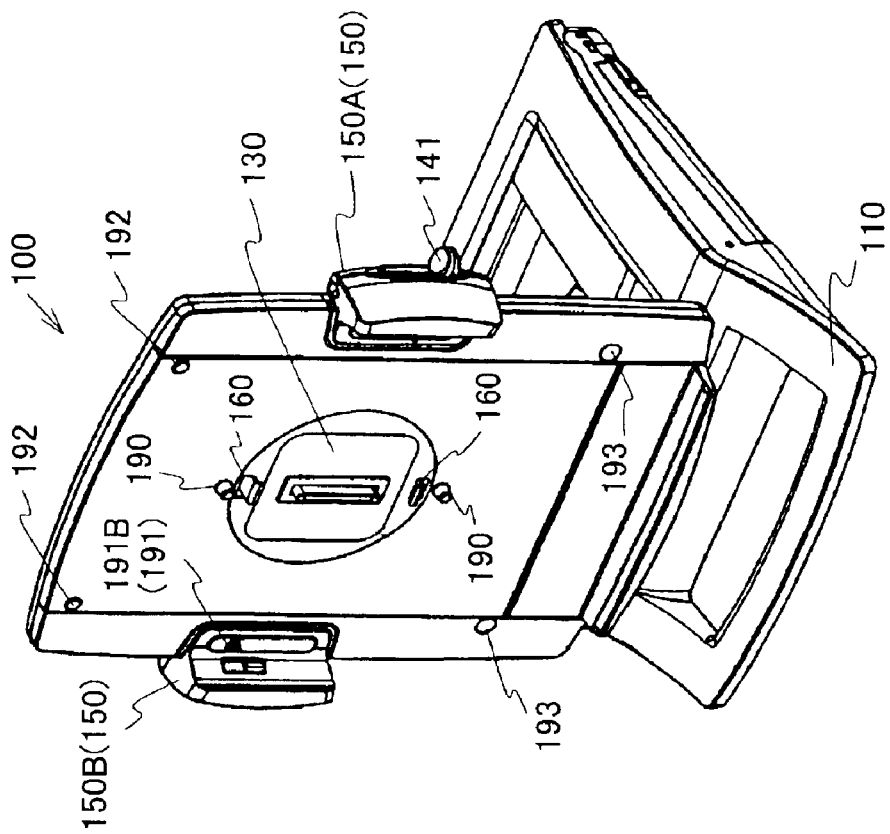
FIG. 4A is a perspective overview showing that the connector cover shown in FIG. 3B is accommodated in the housing.
Figure 4B:
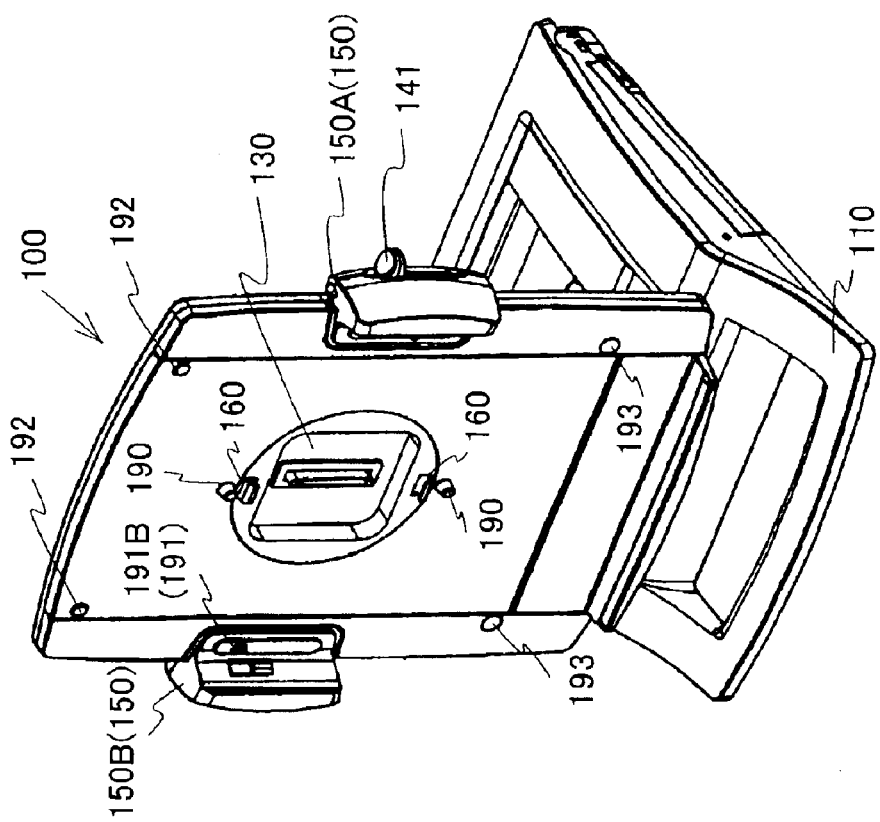
FIG. 4B is a perspective overview showing that the connector cover shown in FIG. 3B exposes from the housing.

The connector elevator mechanism is a mechanism for elevating, in a direction P shown in FIG. 3B, a connector 132 that is connectible to a connector 210 provided on a rear surface 204 on the PC body 200. The connector elevator mechanism includes, as shown in FIG. 3, a connector cover 130, a frame 140, and a pair of balancers 149. Here, FIG. 3A is an exploded perspective view of the upper cover 122 on the housing 121, the connector elevator mechanism, and the connector cover 130. FIG. 3B is a partial sectional view for explaining an elevation of the contact cover 130. FIG. 4A is a perspective overview of the docking station 100 corresponding to the left side shown in FIG. 3B, while FIG. 4B is a perspective overview of the docking station 100 corresponding to the right side shown in FIG. 3B.

The upper cover 122 of the housing 121 has an opening 122a at the center, through which opening 122a the connector 132 projects and retreats from the housing 121.

The connector cover 130 has the connector 132 and elevates with the frame 140. The connector cover 130 includes, as shown on the right side in FIG. 3A, a cover 131, a connector 132, and a lift 133.

The cover 131 covers the connector 132 to protect the same. The cover 131 forms an opening 131a to expose the connector 132 at its center, and connecting portions 131b connectible with the lift 133 at front, back, left and right ends. Each connecting part 131b serves as a flat spring, and has a bent tip engageable with a fixing hole 133b in the lift 133.

The connector 132 is connectible to the connector 210 provided on the rear surface 204 on the PC body 200, and fixed onto the lift 133 through a base 132a and four screws 134. The connector 132 is connected to a wiring board (not shown) under the lift 133.

The lift 133 includes four projections 133a, four fixing holes 133b, and four fixing parts 133c at front, back, right and left ends. These projections 133a are inserted into grooves 145a provided in the frame 140, and may move along the grooves 145a. A connecting part 131b on the cover 131 is inserted into each of the fixing holes 133b. A screw hole is provided in each of four fixing parts 133c, and a screw 134 is inserted into each screw hole whereby the connector 132 is fixed onto the lift 133.

In connection with the connector elevator mechanism, the frame 140 moves in the housing 121 in a direction perpendicular to the connector cover 130 (i.e., direction H in FIG. 3), and serves to elevate the connector cover 130. The frame 140 includes a lock lever 141, a pair of connecting parts 144, and a support part 145.

As shown in FIG. 2, the lock lever 141 exposes from the housing 121 and a user holds the lock lever 141 and uses it to move the frame 140. The lock lever 141 may move between an unlock position at the left side shown in FIG. 3B and FIG. 4A, and a lock position at the right side shown in FIG. 3B and FIG. 4B. As understood from FIG. 4A, the lock lever 141 is located at the uppermost position when located at the unlock position, while the lock lever 141 is located at the lowermost position when located at the lock position.

FIGS. 9B, 9D and 9F, which will be described later, also show movements of the lock lever 141.

A pair of balancers 149 are connected to a pair of connecting parts 144. The connecting parts 144 and balancers 149 are provided for smooth movements of the frame 140. The support part 145 supports the connector cover 130. The support part 145 has a sectional U-shape, and includes, at its side surface, four grooves 145a into which projections 133a on the lift 133 are inserted. The groove 145a extends in a direction oblique to the height direction of the support part 145. As a result, as the frame 140 moves in the direction H as shown in FIG. 3B, the projections 133a move along the groove 145a and the connector cover 130 moves in the direction P that is orthogonal to the direction H.

The connector 132 exposes from the housing 121 when the frame 140 is located at the lock position, as shown in the right side in FIG. 3B, and is accommodated in the housing 121 when the frame 140 is located at the unlock position, as shown in the left side in FIG. 3B. When the frame 140 is located at the unlock position, the PC body 200 is attached to the PC fixing part 120. As shown in FIG. 4A, when the frame 140 is located at the unlock position, the connector 132 retreats into the housing 121 and thus the connector 210 of the PC body 200 does not collide with the connector 132.

The connector cover 130 may minutely move in the direction H and a direction W orthogonal to the direction H. Therefore, the connector 132 may absorb a positional offset of the connector 210 of the PC body 200.

The lock mechanism locks the PC body 200 when the frame 140 is located at the lock position at the right side in FIG. 3B, and unlocks the PC body 200 when the frame 140 is located at the unlock position at the left side in FIG. 3B. There are two lock mechanisms in the instant embodiment.

A description will now be given of a first lock mechanism. The first lock mechanism is a mechanism for locking a side surface 202 on the PC body 200. The first lock mechanism includes a pair of provisional locks 152 and a pair of springs 154 provided on the side guide 150, and a pair of ribs 142 in the frame 140.

As shown in FIG. 3A, the frame 140 further includes a pair of ribs 142 accommodated in the housing 121. The rib 142 serves to turn a provisional lock by the provisional lock 152 to a real lock. The "provisional lock" and "real lock" will be described later. The rib 142 projects from the frame 140 into the side guide 150.

The side guide 150 is provided so as to enclose the opening 122a. The side guide 150 includes a right side guide 150A and a left side guide 150B, and is provided on the side suffrace on the housing 121. The side guides 150A and 150B are similar structure except that openings 151d and 151e are provided at the side guide 150A. The lock lever 141 projects from the frame 140 through the opening 151d. An unlock button 172, which will be described later, projects through the opening 151e. Here, the reference numeral 150 generalizes 150A and 150B unless otherwise specified.

The side guide 150 includes a pair of holding parts 151, the provisional locks 152, and the springs 154, in connection with the first lock mechanism.

The holding part 151 holds a pair of side surfaces 202 on the PC body 200 shown in FIGS. 1 and 2. The holding part 151 includes a perpendicular surface 151a and a horizontal surface 151b in its inside, and an opening 151c in the perpendicular surface 151a. The provisional lock 152 projects and retreats through the opening 151c. As shown in FIG. 3A, the side guide 150A is provided with the opening 151d, through which the lock lever 141 projects from the frame 140.

FIG. 5 shows a relationship between the provisional lock 152 and the spring 154. FIG. 5A is an exploded sectional view of the provisional lock 152 and the spring 154. FIG. 5B is a partial sectional view showing that the PC body 200 starts being inserted into the PC fixing part 120. FIG. 5C is a partial sectional view showing the PC body 200 being inserted into or separated from the PC fixing part 120. FIG. 5D is a partial sectional view showing the projection part 152a on the provisional lock 152 is inserted into the concave part 203 provided on the side surface 202 on the PC body 200. FIG. 5E is a partial sectional view showing that the frame 140 moves to the lock position after the PC body 200 is attached to the PC fixing part 120. FIG. 5F is a sectional view of the side guide 150A in a state shown in FIG. 5E.

As shown in FIG. 5A, the provisional lock 152 is provided rotatable around the axis 153, and includes a projection part 152a projecting from the opening 151c, a slope 152b and a rear surface 152c. The spring 154 applies an elastic force in a direction projecting the provisional lock 152 from the opening 151c. Although the provisional lock 152 is usually located at the projection position shown in FIG. 5B by the elastic force by the spring 154, the projection part 152a may move to the retreat position to retreat from the opening 151c while the PC body 200 is attached to or separated from the PC fixing part 120 as shown in FIG. 5C. In other words, in FIG. 5B, when the PC body 200 moves in the arrow direction in FIG. 5B, the end 202a on the side surface 202 on the PC body 200 contacts the slope 152b, and rotates the provisional lock 152 clockwise as shown in FIG. 5C.

As shown in FIG. 5D, when the provisional lock 152 is located at a projection position, the projection part 152a is engaged with a concave part 203 provided in the side surface 202 on the PC body 200. At this time, the PC body 200 is provisionally locked. In other words, since the spring 154 forces the provisional lock 152 in the projecting direction and engages the projection part 152a with the concave part 203, the PC body 200 is fixed onto the PC fixing part 120. However, this fixture is not absolute, and when a user may apply a force, the PC body 200 may be disengaged from the PC fixing part 120, as shown in FIG. 5C. Thus, "provisional lock or provisional fixture" means such a state that although the PC body 200 is fixed, this fixture is not perfect and thus the PC body 200 may be disengaged from the PC fixing part 120 when the user applies a predetermined force. In other words, when the user applies a force against the elastic force by the spring 154 in the upper direction from a state shown in FIG. 5C, the provisional lock 152 rotates clockwise as shown in FIG. 5C.

However, when the rib 142 contact the rear surface 152c on the provisional lock 152 as shown in FIG. 5E, the provisional lock 152 cannot retreat to the retreat position even when the user applies his force, and the provisional lock turns to the real lock. The "real lock" means such a usual lock that the PC body 200 is perfectly fixed onto the PC fixing part 120 and cannot be disengaged from the PC fixing part 120.

The provisional lock state turns to the real lock state when the frame 140 moves to the lock position. This state is also a state where the connector 132 exposes from the housing 121 as shown in FIG. 4B. The real lock state means not only that the PC body 200 cannot be disengaged from the PC fixing part 120 as shown in FIG. 5E, but also that the PC body 200 cannot be attached to the PC fixing part 120 that has been turned to the real lock state. In other words, the PC body 200 cannot be attached in the state shown in FIG. 4B. Such a structure is preferable in preventing a collision between the connector 210 of the PC body 200 and the connector 132.

Figure 6C:
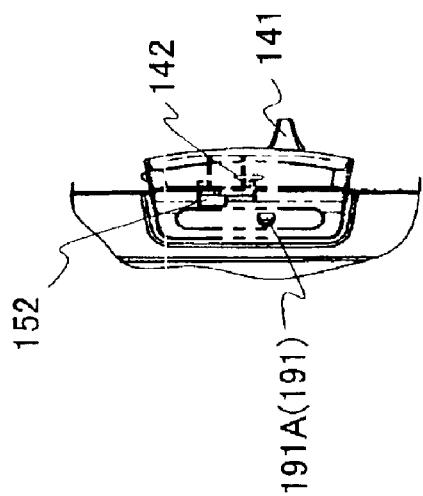
FIGS. 6A–6C are partially transparent plane views for explaining a relationship between a frame and a rib shown in FIG. 3.
Figure 6B:
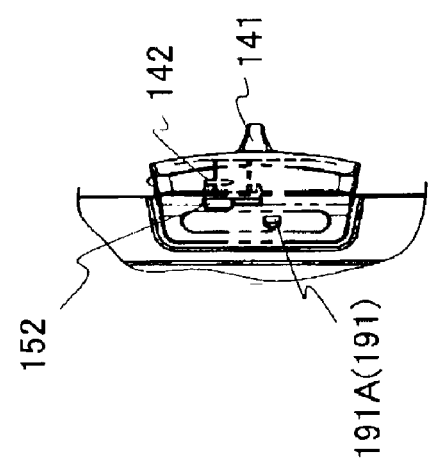
Figure 6A:
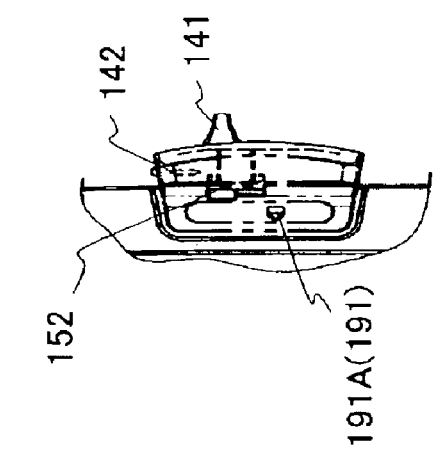

Referring now to FIG. 6, a description will be given of a positional relationship between the rib 142 and the provisional lock 152. Here, FIG. 6A is a partially transparent plane view of the side guide 150A when the frame 140 is located at the unlock position. FIG. 6B is a partially transparent plane view the side guide 150A and its vicinity when the frame 140 is located between the unlock position and the lock position. FIG. 6C is a partially transparent plane view of the side guide 150A and its vicinity when the frame 140 is located at the lock position.

As shown in FIG. 6A, when the frame 140 is located at the unlock position, the rib 142 is apart from the provisional lock 152 and the provisional lock 152 may freely rotate as shown in FIG. 5C. As shown in FIG. 6B, when the frame 140 is located in the middle of the unlock position and the lock position, the rib 142 is located on the rear surface of the provisional lock 152 and the provisional lock 152 can no longer rotate as shown in FIG. 5E. As shown in FIG. 6C, when the frame 140 is located in the middle of the lock position, the rib 142 is located on the rear surface of the spring 154 near the provisional lock 152, and the provisional lock 152 can no longer rotate as shown in FIG. 5E.

Thus, according to the first lock mechanism, when the frame 140 rotates to the lock position, the provisional lock 152 locks the PC body 200.

Figure 24:
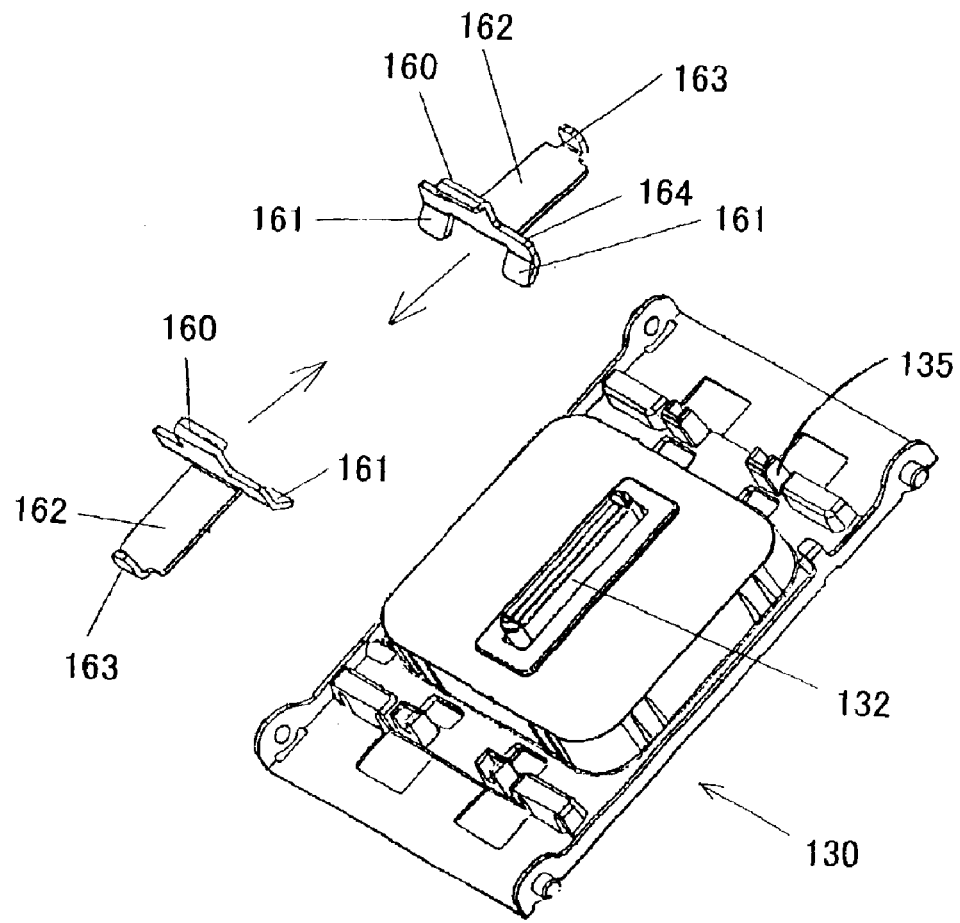
FIG. 24 is a perspective overview for explaining the lock mechanism using the claw shown in FIG. 2.

A description will now be given of the second lock mechanism, with reference to FIGS. 3, 4, 24 and 25. Here, FIG. 24 is a perspective overview for explaining the second lock mechanism. FIG. 25 is sectional views for explaining the operation of the second lock mechanism, wherein FIG. 25A shows that the frame located at the unlock position as shown in the left side in FIG. 3A, and FIG. 25B shows that the frame located at the lock position as shown in the right side in FIG. 3.

The second lock mechanism is a mechanism for locking the rear surface 204 on the PC body 200. The second lock mechanism includes four projections 135 provided on the connector cover 130, a lock member including a pair of claws 160, an engagement part 161, a pair of mount parts 162, and a pair of engagement parts 163, a pair of springs 167, and a third lock mechanism for locking the frame 140 at the lock position.

As shown in FIG. 24, each claw 160 is provided with the bifurcated engagement part 161, the mount part 162 is located at the bifurcation, and the engagement part 163 is provided on the other end of the mount part 162. This lock member may be formed by bending and severing one metal sheet. The claw 160 is a metal tab for locking the PC body 200 by getting engaged with the lock hole 212 formed on the rear surface 204 on the PC body 200, and includes a perpendicular part and a bent part. Each engagement part 161 inclines to the perpendicular part 164, and contacts the projection 135 when the frame 140 is located at the unlock position. As shown in FIG. 25, the mount part 162 is mounted with the spring 167. The engagement part 163 is engaged with the other end of the spring 167. The spring 167 is a compression spring that is engaged with the engagement part 122c of the upper cover 122 at its one end, and engaged with the engagement part 163 at the other end. Therefore, each spring 167 applies an elastic force to the claw 167 from the projection position to the retreat position, or so that the claw 160 may return.

As shown in FIG. 3A, the opening 122b is provided on the upper cover 122 on the housing 121, and each claw 160 projects from the opening 122b. Each claw 160 is adapted to be movable between the retreat position or unlock position shown in FIG. 4A and the projection position or lock position shown in FIG. 4B.

Referring now to FIGS. 4 and 25, a description will be given of these states. In the state shown in FIGS. 4A and 25A, the frame 140 is located at the unlock position, and the claws 160 are located at most distant positions from each other. In this state, as shown in FIG. 25A, the spring 167 applies an elastic force to the engagement part 163. The projection 135 contacts the engagement part 161.

Then, as shown in FIG. 3B, the frame 140 moves to the lock position and exposes the connector 132. As the connector cover 130 ascends, the projections 135 ascend and move a pair of claws 160 inside against the elastic force by the spring 167. The projections 135 move along the engagement parts 161, and then along the perpendicular part 164. In the state shown in FIGS. 4B and 25B, the claws 160 are located at positions where they are the closest to each other.

A pair of lock holes 212 form the engagement part 213 inside the surface to which they approach. The claw 160 is engaged releasably with the lock hole 212 when located at the retreat position, and engaged with the engagement part 213 in the lock hole 212 when located at the projection position.

The third lock mechanism locks the frame 140 at the lock position. The third lock mechanism includes a shaft 124 provided under the lower cover 123 shown in FIG. 7, and a stopper 125, an engagement part 143 on the frame 140, an engagement member 170 shown in FIG. 7, and a spring 179. Here, FIG. 7A is an exploded perspective view of the lower cover 123 of the housing 121 and the engagement member 170. FIG. 7B is a perspective view of the engagement member 170 attached to the lower cover 123 of the housing 121. FIG. 7C is a perspective view of the engagement member 170 viewed from a different angle from that in FIG. 7B.

As shown in FIG. 7, the lower cover 123 is provided with the shaft 124 and the stopper 125, and an opening 123a in the side guide 150A. An unlock button 172, which will be described later, may project and retreat through the opening 123a. The shaft 124 is inserted into the hole 171a in the engagement member 170, and enables the engagement member 170 to rotate around the axis 124. The stopper 125 contacts the perpendicular part 171b in the engagement member 170, as shown in FIG. 7B, and restricts the counterclockwise rotation shown in FIG. 7 of the engagement member 170.

The engagement member 170 serves to lock and unlock the frame 140 at the lock position. The engagement member 170 includes an approximately T-shaped substrate 171, the unlock button 172, and an engagement part 174. The substrate 171 includes a hole 171a engageable with the shaft 124, and a perpendicular part 171b that contacts the stopper 125. The unlock button 172 is used by a user to press in unlocking the frame 140 that has been locked at the lock position, and projects from the opening 123a provided in the lower cover 123. The engagement part 174 is engaged with the engagement part 143 of the frame 140, and includes a hypotenuse 174a and a horizontal part 174b.

The spring 179 applies an elastic force to the engagement member 170 counterclockwise in FIG. 7 or in a direction toward the stopper 125. Usually, the engagement member 170 contacts the stopper 125 as shown in FIG. 7B, and the unlock button 172 projects from the opening 123a.

As shown in FIG. 3A, the frame 140 further includes an engagement part 143 that projects lankily. In addition, as shown in FIG. 8, the engagement part 143 includes a hypotenuse 143a and the horizontal part 143b. Here, FIG. 8A is a partially transparent plane view of an arrangement between the engagement parts 143 and 174 when the frame 140 is located at the unlock position. FIG. 8B is a partially transparent plane view of an arrangement between the engagement parts 143 and 174 when the frame 140 moves from the unlock position to the lock position. FIG. 8C is a partially transparent plane view of an arrangement between the engagement parts 143 and 174 when the frame is located at almost the lock position or when the unlock button 172 is pressed in FIG. 8D.

As shown in FIG. 8A, when the frame 140 is located at the unlock position, the engagement part 170 is at the state shown in FIG. 7B, and the engagement parts 174 and 143 are apart from each other. As shown in FIG. 8B, when the frame 140 moves from the unlock position to the lock position, the hypotenuse 143a of the engagement part 143 contacts the hypotenuse 174a of the engagement part 174, and rotates the engagement member 170 counterclockwise in FIG. 8B. Thus, the hypotenuse 143a of the engagement part 143 may slide and descend the hypotenuse 174a of the engagement part 174 as shown in FIG. 8C. When the frame 140 moves to the lock position, the horizontal part 174b of the engagement part 174 contacts the horizontal part 143b of the engagement part 143, as shown in FIG. 8D, and restricts movements of the frame 140 and the engagement part 143 in the direction $H_1$, whereby the frame 140 is locked at the lock position. In order to move the engagement part 143, the unlock button 172 may be pressed as shown in FIG. 8C. Thereby, the engagement part 174 retreats clockwise and enables the engagement part 143 to move in the direction $H_1$.

Referring now to FIG. 9, a description will be given of an operation of the second lock mechanism. Here, FIGS. 9A and 9B show the side guide 150A and its vicinity when the frame 140 is located at the unlock position, wherein FIG. 9A is a sectional view from the inside to the outside, and FIG. 9B is a side view viewed from the outside. FIGS. 9C and 9D show the side guide 150A and its vicinity when the frame 140 is moving from the unlock position to the lock position, wherein FIG. 9C is a sectional view from the inside to the outside, and FIG. 9D is a side view viewed from the outside. FIGS. 9E and 9F show the side guide 150A and its vicinity when the frame 140 is located at the lock position, wherein FIG. 9E is a sectional view from the inside to the outside, and FIG. 9F is a side view viewed from the outside.

As shown in FIG. 9, as the frame 140 moves from the unlock position to the lock position, an interval between a pair of claws 160 becomes narrow. Therefore, it is understood that when the claw 160 is inserted into the lock hole 212 in the PC body 200 in FIG. 9A, the claw 160 is engaged with the engagement part 213 in FIG. 9C. However, only this might cause the claw 160 to reset to the state in FIG. 9A, and thus the PC body 200 is not locked perfectly. However, in addition to this, the instant embodiment locks the frame 140 using the engagement member 170, and does not allow the claw 160 to return to the state shown in FIG. 9A. As a result, the PC body 200 is locked by the claw 160.

Referring now to FIGS. 9A, 9C, and 9E, a description will be given of a holding mechanism for holding the frame 140 at the unlock position movably. In other words, when the frame 140 free moves at the unlock position, the gravity moves the frame 140 to the lock position shown in FIG. 4B and exposes the connector 132, causing the connector 132 to get undesirably damaged. Accordingly, the holding mechanism holds the frame 140 movably at the unlock position. Alternatively, the frame 140 may be locked at the lock position, but that structure requires plural unlock buttons, making user's operations complicated. Therefore, the present invention holds the frame 140 movably.

The holding mechanism includes an engagement part 126 provided on the lower cover 123 of the housing 121, and an engagement part 148 engageable elastically and detachably with the engagement part 126. According to the instant embodiment, the engagement part 126 is made of metal plate, and the engagement part 148 is made of elastically deformable resin flat spring. As shown in FIG. 9A, when the frame 140 is located at the unlock position, the engagement parts 126 and 148 are engaged with each other. As shown in FIG. 9B, as the frame 140 moves from the unlock position, they are disengaged from each other. Thus, the engagement between them does not hinder the movement of the frame 140, but has such a unifying force that the frame 140 does not fall down due to the gravity in the state in FIG. 4A.

A description will now be given of the positioning mechanism of this embodiment. The positioning mechanism is a mechanism for positioning connectors 210 and 132 horizontally in an attempt to connect the connector 210 of the PC body 200 to the connector 132. If the connectors 132 and 210 are engaged horizontally with each other, a load applies to the root of the connector and possibly causes damages, such as soldering peel-off.

Figure 10:
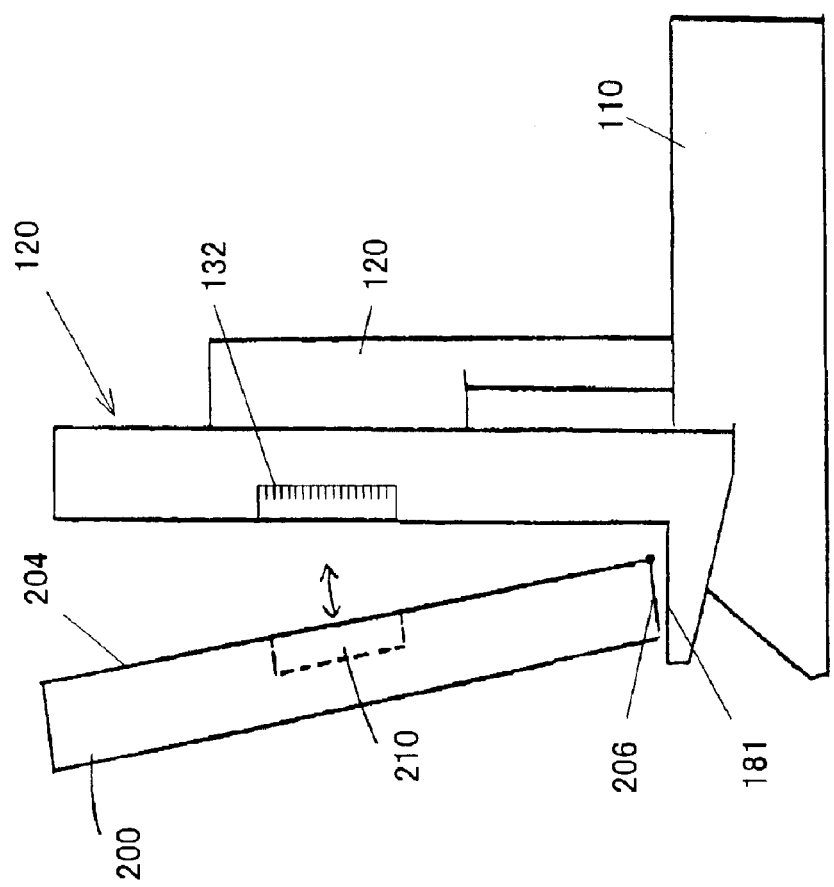
FIG. 10 is a schematic sectional view for explaining a method for attaching the PC body shown in FIG. 2 to the PC fixing part.
Figures 12A, 12B:
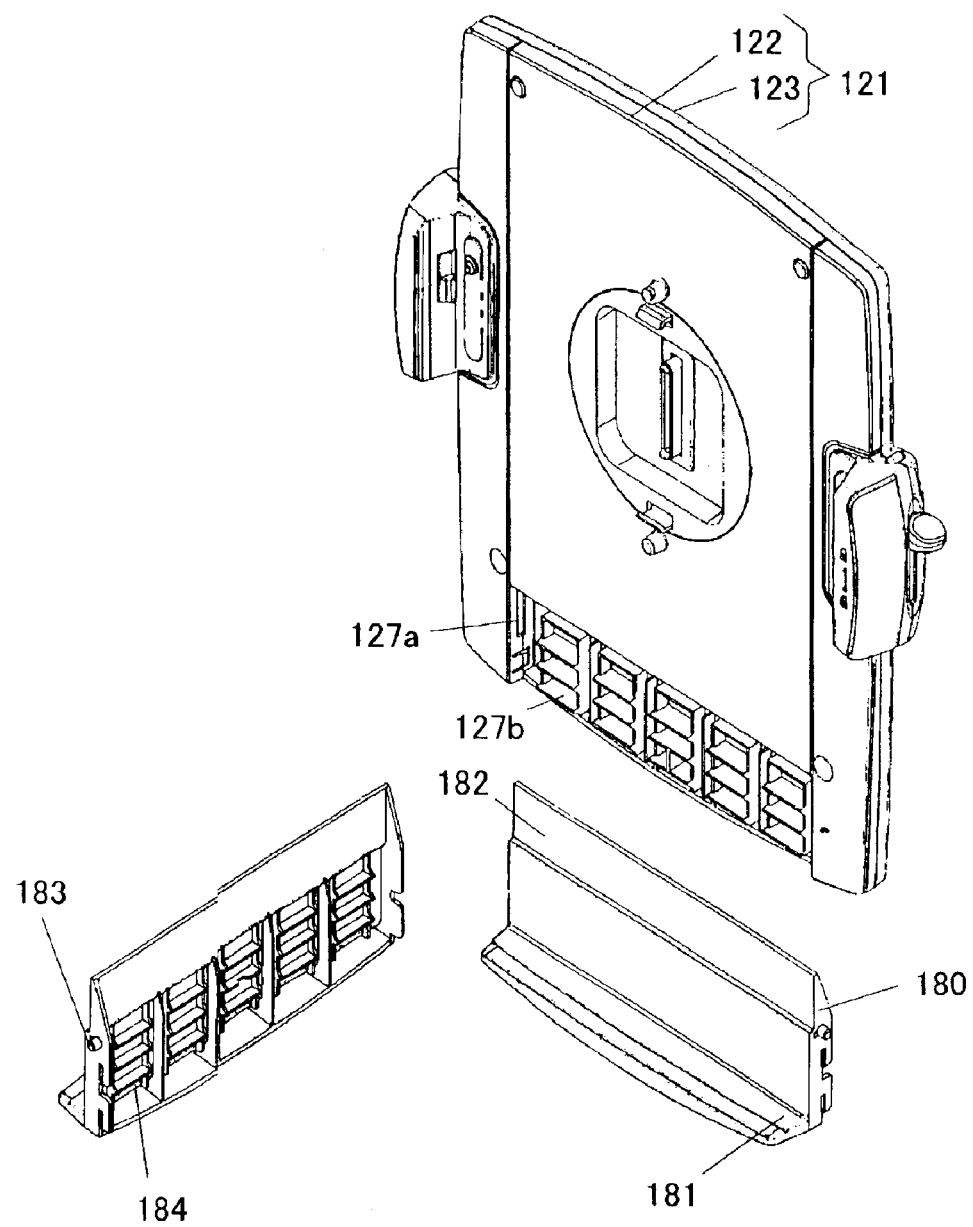
FIGS. 12A–12B are perspective views showing a relationship between the guide shown in FIG. 11 and the docking station.

Referring not to FIGS. 2, 10 to 13, a description will be given of a guide 180 as one positioning mechanism. Here, FIG. 10 is a schematic sectional view for explaining the PC body 200 attached using the guide 180 as shown in FIG. 2. FIG. 11A is a left side view of the guide 180. FIG. 11B is a front view of the guide 180. FIG. 11C is a right side view of the guide 180. FIG. 11D is a bottom view of the guide 180. FIG. 11E is a top view of the guide 180. FIG. 11F is a transparent view of the guide 180 attached to the upper cover 122. FIG. 12A is a perspective overview of a front surface of the guide 180 and the upper cover 122 from which the guide 180 has been removed. FIG. 12B is a perspective overview of a rear surface of the guide 180. FIGS. 13A to 13F are sectional views for explaining an engagement between the guide 180 and the upper cover 122. FIGS. 13A to 13D are sectional views for explaining an engagement between the guide 180 and the upper cover 122 viewed from line G—G in FIG. 11F. FIGS. 13D to 13F correspond to FIGS. 13A to 13D, respectively, and are sectional views taken along line F—F in FIG. 11F.

The guide 180 serves to roughly position the PC body 200. The guide 180 includes a mount part 181, a step part 182, a pair of projections 183, and a plurality of engagement parts 184.

As shown in FIGS. 2 and 10, the user mounts the bottom part 206 of the PC body 200 onto the mount part 181, and attaches the PC body 200 to the PC fixing part 120 by falling down the rear surface 204 toward the PC fixing part 120 around the bottom surface 206. Therefore, this embodiment does not slide the PC body 200 along the docking station 100 unlike the conventional examples.

The step part 182 is entirely or partially located on the rear surface of the upper cover 122, as shown in FIGS. 13E and 13H, and supports the guide 180 in the upper cover 122. A pair of projections 183 is engaged with the elongated concave part 127a in the upper cover 122 in FIG. 12A, and moves along the concave part 127a. A plurality of engagement parts 184 are similarly engaged with the plural engagement parts 127b in the upper cover 122.

The instant embodiment adapts the guide 180 to be movable. This is because the PC body 200 is compatible with different battery parts 230, such as a six-battery and a nine-battery, and these different battery parts 230 have different lengths. FIGS. 13A and 13E show the guide 180 corresponding, for example, to the six-battery. In this state, the step part 182 is veiled approximately completely behind the rear surface of the upper cover 122, and the projection 183 is located at the approximately uppermost position of the concave part 127a. For the PC body 200 that has nine batteries in the battery part 230, the guide 180 is inclined around the projection 183, as shown in FIGS. 13B and 13F, the projection 183 is descended along the concave part 127a, as shown in FIGS. 13C and 13G, and then the inclination is returned to the original state as shown in FIGS. 13d and 13H.

Figure 15:
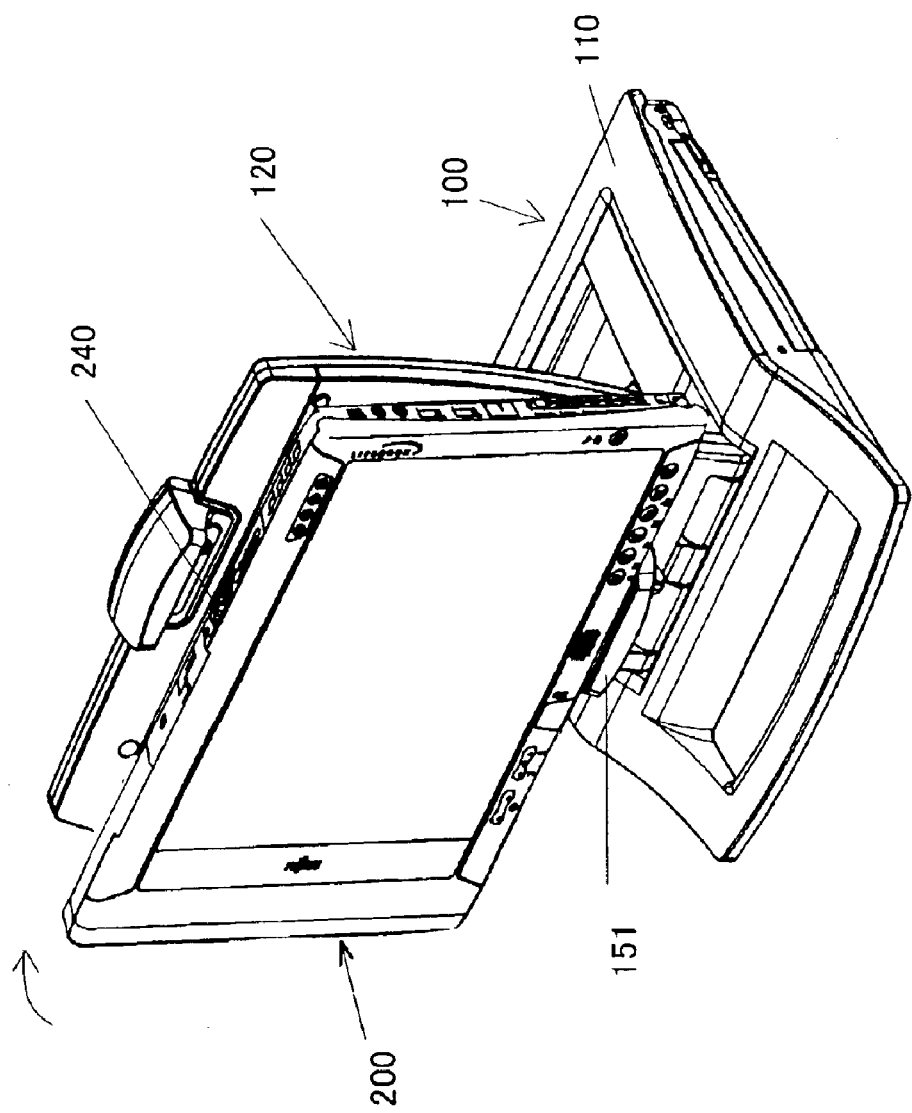
FIG. 15 is a perspective view showing the PC body being attached to the PC fixing part as shown in FIG. 14.

Referring now to FIGS. 14 and 15, a description will now be given of the side guide 150 as another positioning mechanism. Here, FIG. 14 is an exploded perspective view for explaining a method for attaching the PC body 200 to the PC fixing part 120 using the side guide 150. FIG. 15 is a perspective view for explaining a method for attaching the PC body 200 mounted on the side guide 150 to the PC fixing part 120. As shown in FIGS. 14 and 15, the instant embodiment may utilize the side guide 150, in addition to the guide 180, to attach the PC body 200 to the PC fixing part 120. Since the conventional examples need to slide the PC body 10 along the PC fixing part 20, the loading has been difficult even if the lateral type may be available. On the other hand, the instant embodiment does not have to slide the PC body 200 and merely leans it against the guide and brings it down, improving the operability. In FIGS. 14 and 15, not only the side guide 150 but also the guide 180 may be used at the same time. In FIGS. 14 and 15, a user mounts the side surface 202 of the PC body 202 on the perpendicular part 151a of the holding part 151 in the side guide 150A, and brings the rear surface 204 down around the side surface 202 toward the PC fixing part 120, so as to attach the PC body 200 to the PC fixing part 120.

In FIGS. 14 and 15, 240 is a LAN connector. In the instant embodiment, as shown in FIG. 1B, the side guide 150B is located at a position for covering the LAN connector 240. The PC body 200 has the LAN connector 240, and thus is connectible to a LAN through a cable and the LAN connector 240. On the other hand, the LAN connector 111 is provided on the base 110 on the docking station 100, as shown in FIG. 16B. When the PC body 200 is attached to the docking station 100 while the PC body 200 is connected to the LAN, two networks are connected to one computer, causing hitches and malfunctions of a network device, such as a hub. Accordingly, the instant embodiment covers the LAN connector 240 on the PC body 200 with the side guide 150B, and prevents the PC body 200 from being attached to the docking station 100 while the LAN cable is connected to the PC body 200. As a result, the user removes the cable from the LAN connector 240, then attaches the PC body 200 to the docking station 100, and connects the PC body 200 to the LAN through the LAN connector 111 on the docking station 100.

Although the side guide 150B covers the LAN connector 240 in the instant embodiment, the present invention does not prevent the side guide 150A or guide 180 from covering the LAN connector 240. While the instant embodiment connects a Unshielded Twisted Pair Cable ("UTP") to the LAN connector 240, the PC body 200 may be provided with a reset button to turn off a radio LAN function when the LAN connector 240 is connected to the radio LAN connector, and the guide 180 or the side guide 150 may be provided with a projection to press the reset button.

Referring now to FIGS. 2 to 4, 9 and 16, a description will be given of positioning bosses 190 and 191 as another positioning mechanism. Here, FIG. 16A and 16B are perspective overviews of the docking station 100 viewed from an different angle when the frame 140 is located at the unlock position.

The positioning bosses 190 and 191 serve to position the PC body 200. In particular, the positioning boss 190 is provided around the opening 122a through which the connector cover 130 projects and retreats, and serves to position the PC body 200 near the connector 132.

While the positioning boss 190 in this embodiment aligns a pair of bosses 190 outside a pair of claws 160, and the claws with one straight line, a straight line connecting a pair of claws 160 and a straight line connecting a pair of positioning bosses 190 may be inclined or orthogonal to each other. As shown in FIG. 9, regarding the height from a surface of the upper cover 122, the positioning boss 190 is slightly higher than the claw 160. The positioning boss 190 is inserted into the positioning hole 214 in the rear surface 204 on the PC body 200. As described later, the connectors 132 and 210 are connected to each other after the positioning boss 190 is engaged with the positioning hole 214. The connectors 132 and 210 may be properly aligned by positioning the PC body 200 near the connector 132.

The positioning boss 191 is formed on the horizontal surface 151b on the holding part 151 of the side guide 150. An approximately orthogonal arrangement between a line connecting a pair of positioning bosses 191 and a line connecting a pair of positioning bosses 190 is effective to two-dimensional positioning of the PC body 200. Since the side guide 150 provided with the positioning bosses 191 are provided to enclose the opening 122a, a load is effectively prevented from applying the connectors 132 and 210. The positioning boss 191 includes a positioning boss 191A formed on the side guide 150A, and a positioning boss 191B formed on the side guide 150B, and the positioning boss 191A is arranged lower than the positioning boss 191B in the horizontal direction. Here, the reference numeral 191 generalizes 191A and 191B unless otherwise specified. The positioning boss 191A is inserted into the positioning hole 217A provided in the rear surface 204 on the PC body 200, while the positioning boss 191B is inserted into the positioning hole 217B provided in the rear surface 204 on the PC body 200. Here, the reference numeral 217 generalizes 217A and 217B unless otherwise specified.

Referring now to FIGS. 2 to 4 and 16, a description will be given of a rubber leg 192 and a pair of engagement holes 193 as another positioning mechanism. The rubber leg 192 and the engagement holes 193 are spacers provided to maintain constant a distance between the upper cover 122 and the PC body 200. The constant distance between the upper cover 122 and the PC body 200 would prevent the load from applying to the connectors 132 and 210. The rubber leg 192 is provided on the top of the upper cover 122, and the engagement hole 193 is provided under the upper cover 122 at an interval wider than the rubber leg 192, and inserted into the engagement hole 216 provided in the rear surface 204 on the PC body 200. The engagement hole 193 is inserted into the rubber leg 218 provided in the rear surface 204 on the PC body 200.

Figure 17:
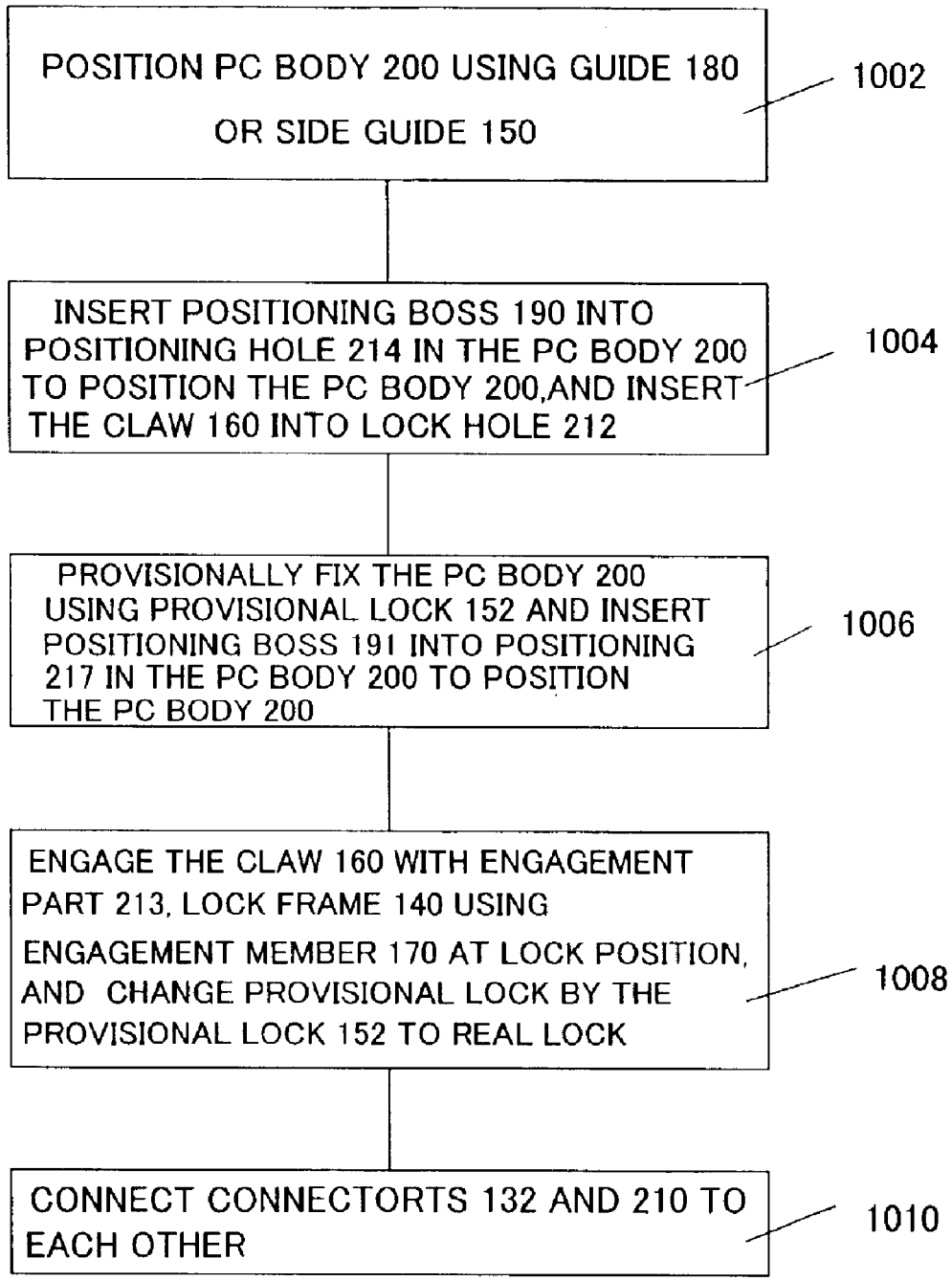
FIG. 17 is a flowchart for explaining positioning and lock operations before connectors of the PC body and the docking station shown in FIG. 1 are connected to each other.

A description will now be given of lock and positioning methods before the connector 132 is connected to the connector 210, with reference to FIG. 17. Here, FIG. 17 is a flowchart for explaining the lock and positioning methods in the instant embodiment.

As shown in FIGS. 2 and 15, the PC body 200 is mounted on the mount part 181 of the guide 180 or the perpendicular part 151a of the side guide 150A for rough positioning (Step 1002), and then the PC body 200 is attached to the PC fixing part 120 by bringing down the PC body 200 around the side surface 202 toward the PC fixing part 120.

In attachment, the positioning bosses 190 are inserted into a pair of positioning holes 214 in the rear surface 204 on the PC body for positioning, and the claws 160 are inserted into the lock holes 212 (Step 1004). Then, the provisional lock 152 is engaged with the concave part 203 in the side surface of the PC body 200 for provisional fixture, and the positioning bosses 191A and 191B are inserted into the positioning holes 217A and 217B in the rear surface 204 on the PC body 200 (Step 1006). Then, the claw 160 is engaged with the engagement part 213 by moving the frame 140 to the lock position so as to turn the provisional lock by the provisional lock 152 to the real lock, and the frame 140 is locked at the lock position using the engagement member 170.

Then, the connector 132 on the connector cover 130, which has ascended along with the movement of the frame 140, is connected to the connector 210 provided on the rear surface 204 on the PC body 200 (Step 1010). Before the step 1010, the horizontal alignment between the connectors 132 and 210 facilitates the connection without causing an overload.

Figure 18A:
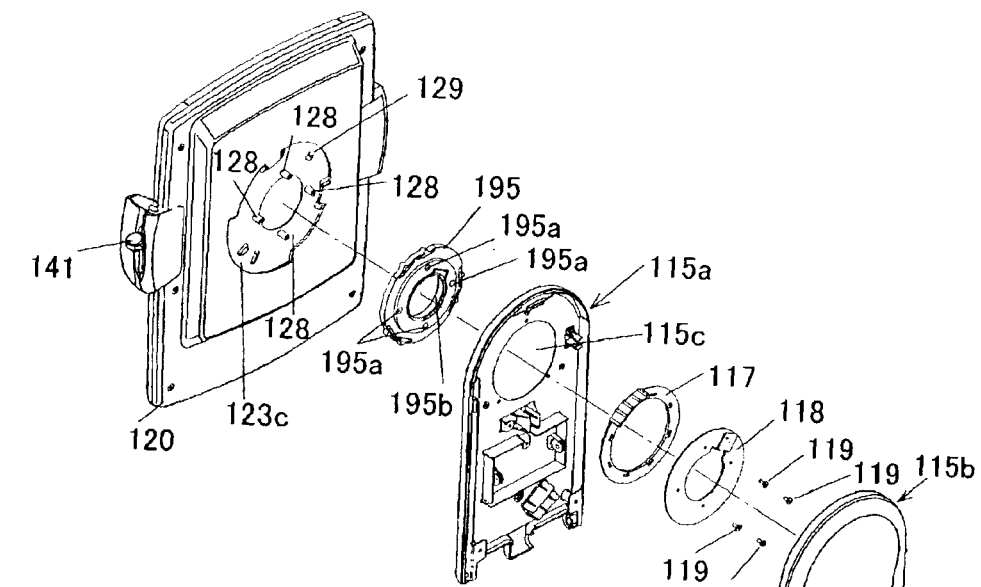
FIGS. 18A–18C are perspective views for explaining a rotary mechanism of the PC fixing part of the docking station shown in FIG. 12. shown in FIG. 18.
Figure 18B:
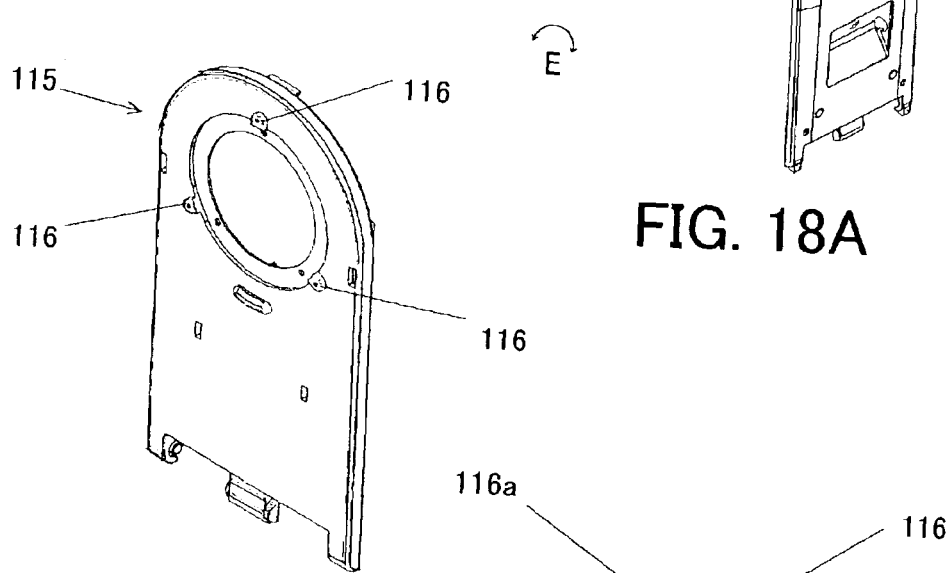
Figure 18C:
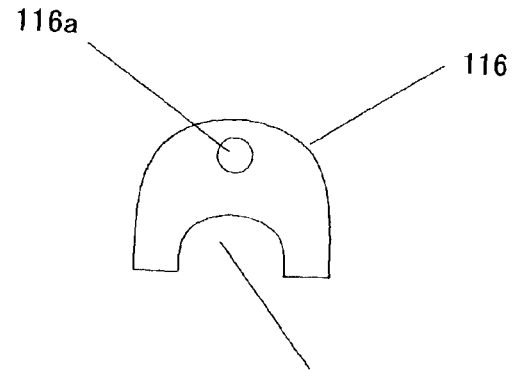
Figure 19B:
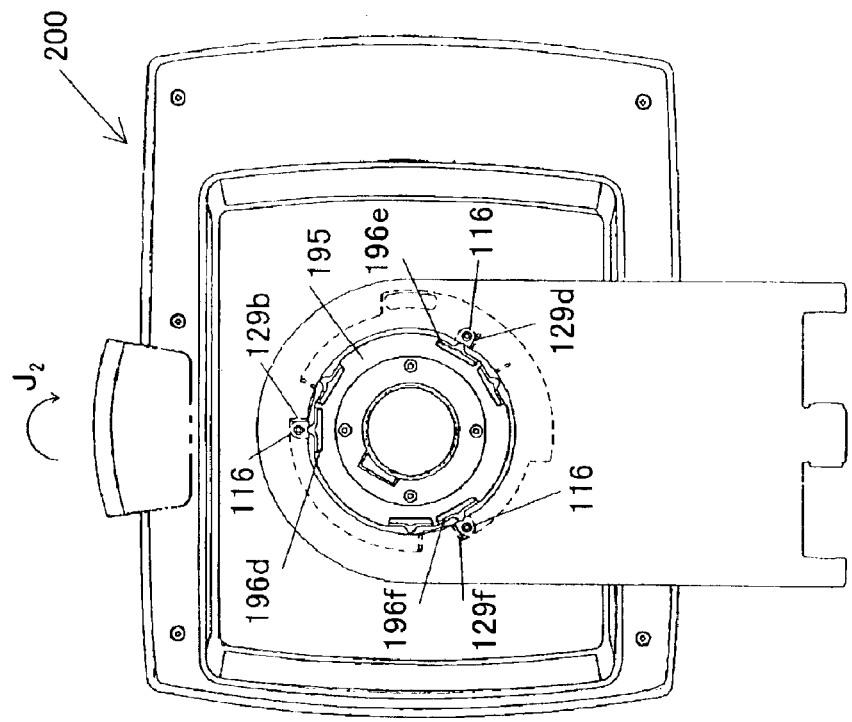
FIGS. 19A and 19B are plane views of a rotary mechanism shown in FIG. 18.
Figure 19A:
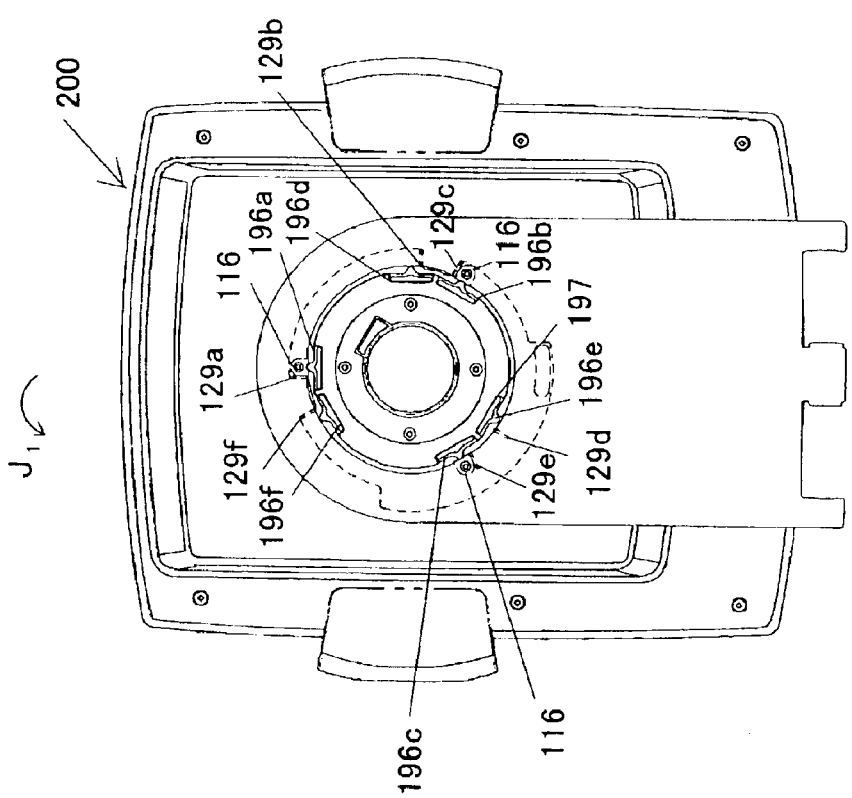

Referring now to FIGS. 18 and 19, a description will be given of the rotary mechanism of the docking station 100. Here, FIG. 18A is an exploded perspective view of the rotary mechanism, and FIG. 18B is a perspective overview of the stand 115 used for the rotary mechanism. FIG. 18C is an enlarged plane view of the projection 116 shown in FIG. 18B. FIG. 19A is a partially transparent plane view showing the PC fixing part 120 that is arranged vertically relative to the stand 115. FIG. 19B is a partially transparent plane view showing the PC fixing part 120 that is arranged laterally relative to the stand 115.

Figure 20:
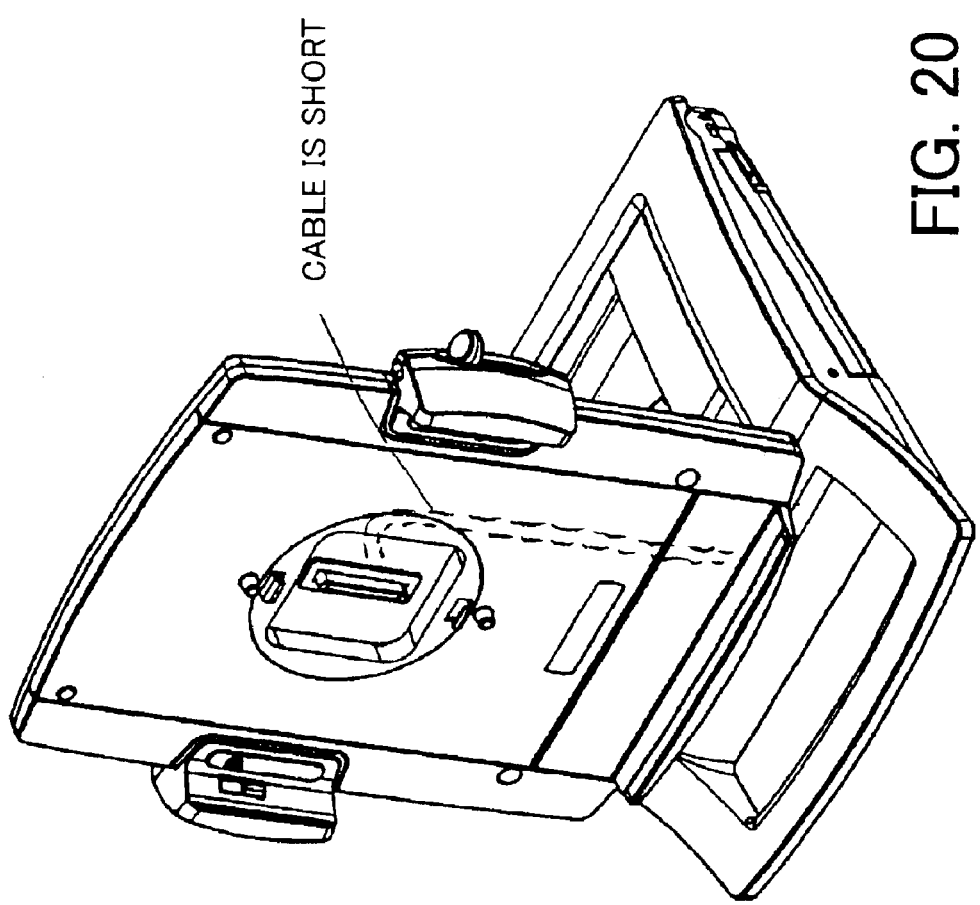
FIG. 20 is a perspective view for explaining a relationship between the rotary mechanism shown in FIG. 18 and a cable length.

The rotary mechanism is a mechanism for rotating the PC fixing part 120 around the connector 132 relative to the base 110 by 90 degrees in direction $J_1$ or $J_2$ in this embodiment. As shown in FIG. 20, the cable length may be made shorter than the structure in FIG. 31 by providing the rotary axis near the connector 132. Here, FIG. 20 is a perspective view to be compared in cable length with the structure shown in FIG. 31. As shown in a dotted line in FIG. 20, when the cable length becomes short, the cable cost and the noise influence on the cable may be reduced.

The rotary mechanism includes, as shown in FIG. 18A, a friction plate 195 to be fixed onto the PC fixing part 120, and the stand 115.

The friction plate 195 is unrotatably onto four axes 128 through axial holes 195a, which axes 128 are provided on the rear surface 123c of the lower cover 123 of the PC fixing part 120. The friction plate 195 has an annular shape, and a hollow part 195b is connected to the connector 132 and a cable shown by a broken line in FIG. 20. The rear surface 123c of the lower cover 123 is provided with six stoppers 129a to 129f. As shown in FIG. 19A, an angle between the stoppers 129a and 129b is set to be 90 degrees. The stoppers 129c and 129d is set to be 90 degrees. The stoppers 129e and 129f is set to be 90 degrees. The rear surface 123c of the lower cover 123 is made, for example, of metal plate, while the friction plate 195 is made, for example, of resin. Here, the reference numeral 129 generalizes reference numerals 129a to 129f unless otherwise specified.

The friction plate 195 includes, as shown in FIG. 19A, six projections 196a to 196f, which are arranged at a regular interval of 120 degrees. Here, the reference numeral 196 generalizes reference numerals 196a to 196f unless otherwise specified. An aperture 197 is provided under each projection 196. Therefore, each projection 196 forms a flat spring.

The stand 115 is fixed onto the base 110 inclinable in a direction E shown in FIG. 18A, and has an upper cover 115a and a lower cover 115b. The upper cover 115a has a circular opening 115c. A stator 116 is provided on a surface on the upper cover 115a, and the stand 115 accommodates a ring 117 and a presser ring 118. The stand 115 is made, for example, of resin. The rings 117 and 118 are fixed onto the friction plate 195 through an opening 115c, and allow the cable connected to the connector 132 and indicated by a broken line shown in FIG. 20 to pass through the opening 115c. The cable is introduced to the base 110 through the stand 115.

The projection 116 is screwed, as shown in FIG. 18C, onto the upper cover 115 through a screw hole 116a, and includes a concave 116b into which the projection 196 is inserted. As described above, the projection 196 serves as an elastic member, and the projection 196 that has been engaged with the concave 116b is fixed movably so that it may rotate when a user applies his force.

The ring 117 is made, for example, of metal plate, while the presser ring 118 is made, for example, of resin. An alternate arrangement of different materials would maintain a smooth rotation by preventing shaving during rotation, etc. Screws 119 fix the rings 117 and 118 are fixed onto a screw hole in a shaft 128 through the upper cover 115a the shaft hole 195a.

The PC body 200 may continue to rotate in the direction $J_1$ from a state shown in FIG. 19A in such a configuration until the uppermost projection 116 contacts the stopper 129b. Similarly, the stopper 116 at the right side contacts the stopper 129b, and the stopper 116 at the left side contacts the stopper 129f. FIG. 19B shows this state. In this case, the projection 196d is inserted into the concave part 116b in the uppermost projection 116, the projection 196e is inserted into the concave part 116b in the right-side projection 116, and the projection 196f is inserted into the concave part 116b in the left-side projection 116.

Similarly, the PC body 200 may continue to rotate in the direction $J_2$ from a state shown in FIG. 19B until the uppermost projection 116 contacts the stopper 129a. Similarly, the stopper 116 at the right side contacts the stopper 129c, and the stopper 116 at the left side contacts the stopper 129e. FIG. 19A shows this state. In this case, the projection 196a is inserted into the concave part 116b in the uppermost projection 116, the projection 196b is inserted into the concave part 116b in the right-side projection 116, and the projection 196c is inserted into the concave part 116b in the left-side projection 116.

In each state shown in FIGS. 19A and 19B, the elastic force by the projection 196 works unless a user applies a torque.

Figure 21:
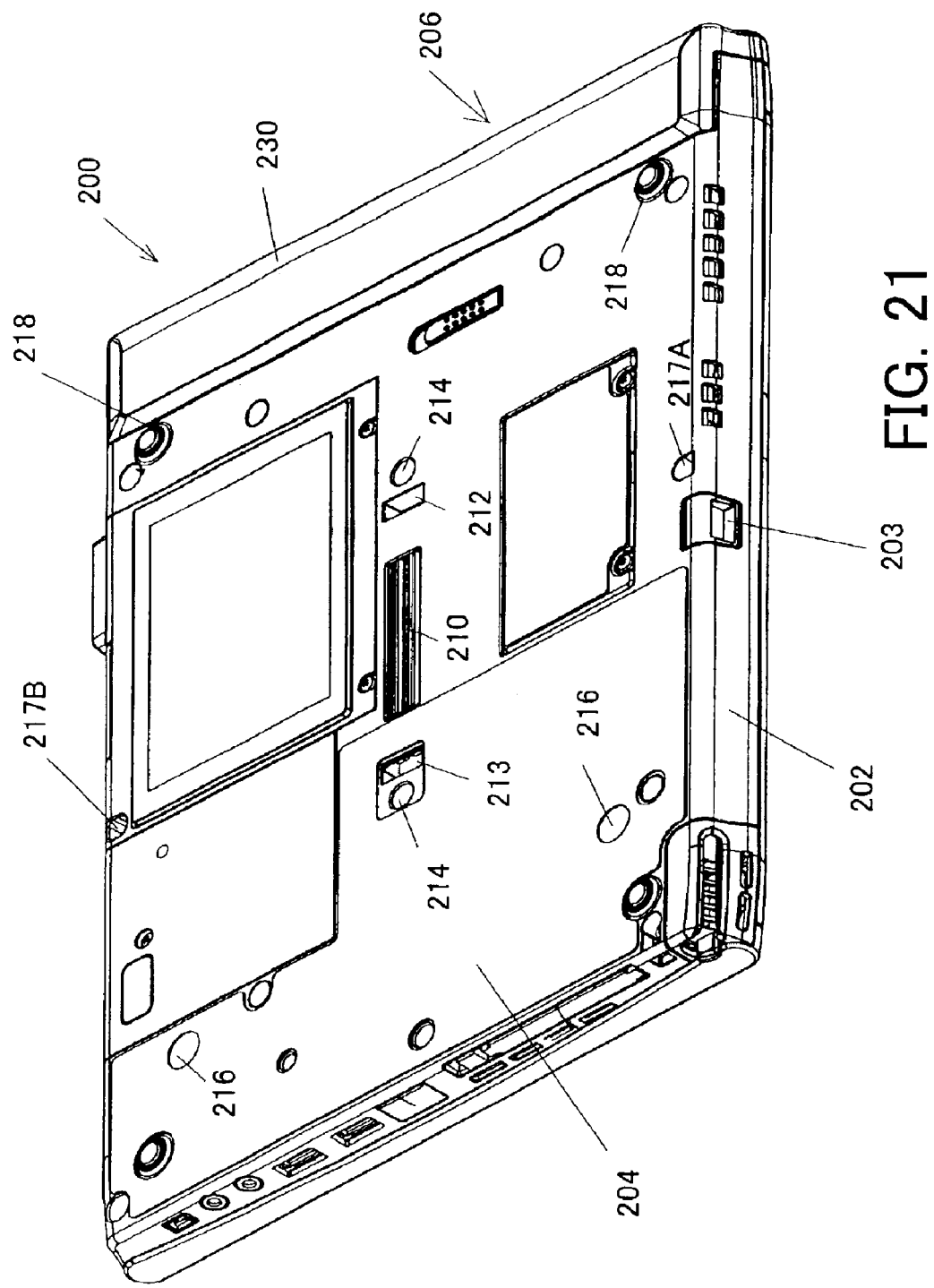
FIG. 21 is a perspective overview showing a rear surface of the PC body shown in FIG. 1.
Figure 22:
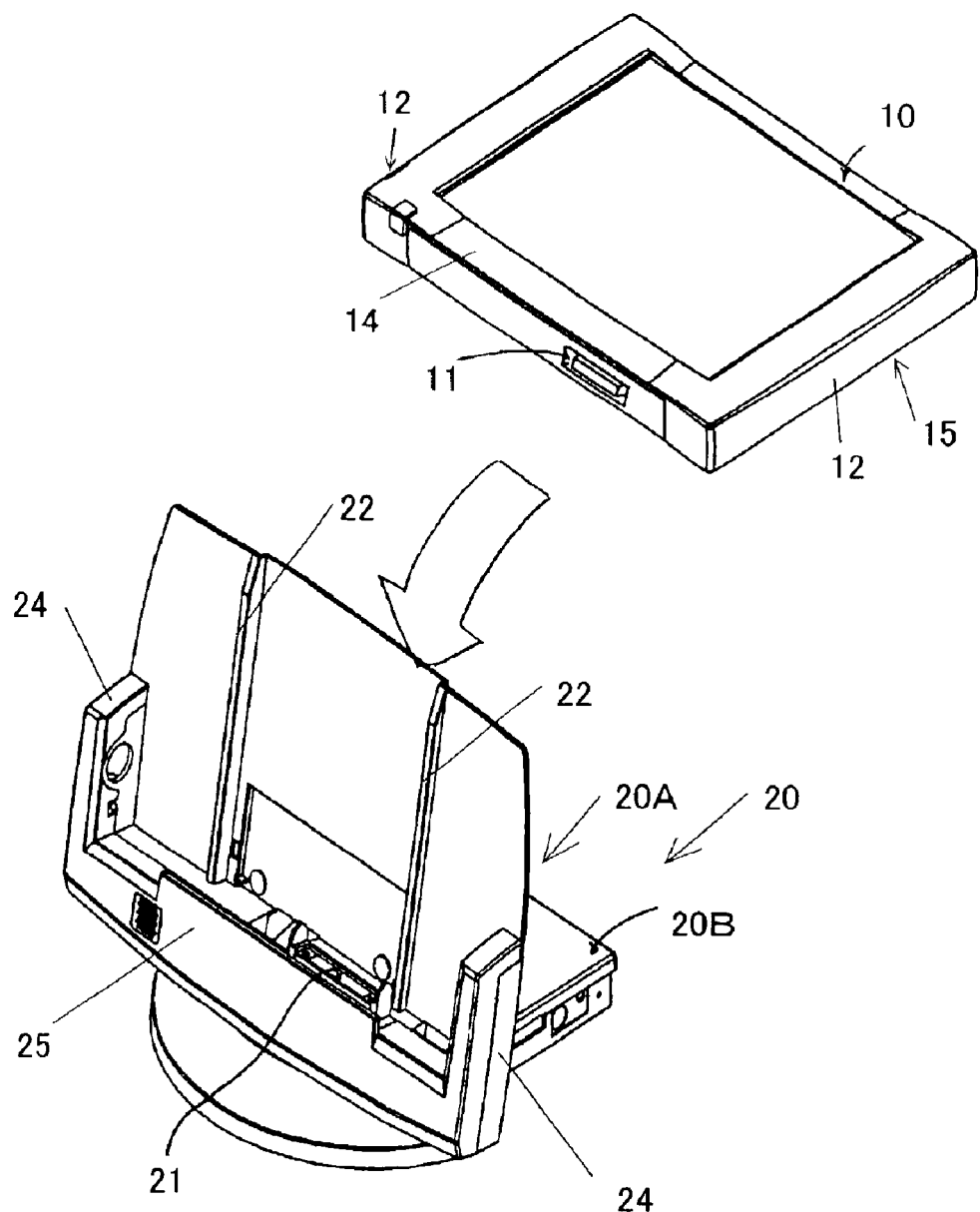
FIG. 22 is a perspective overview for explaining structures of the conventional PC body and docking station.
Figure 23:
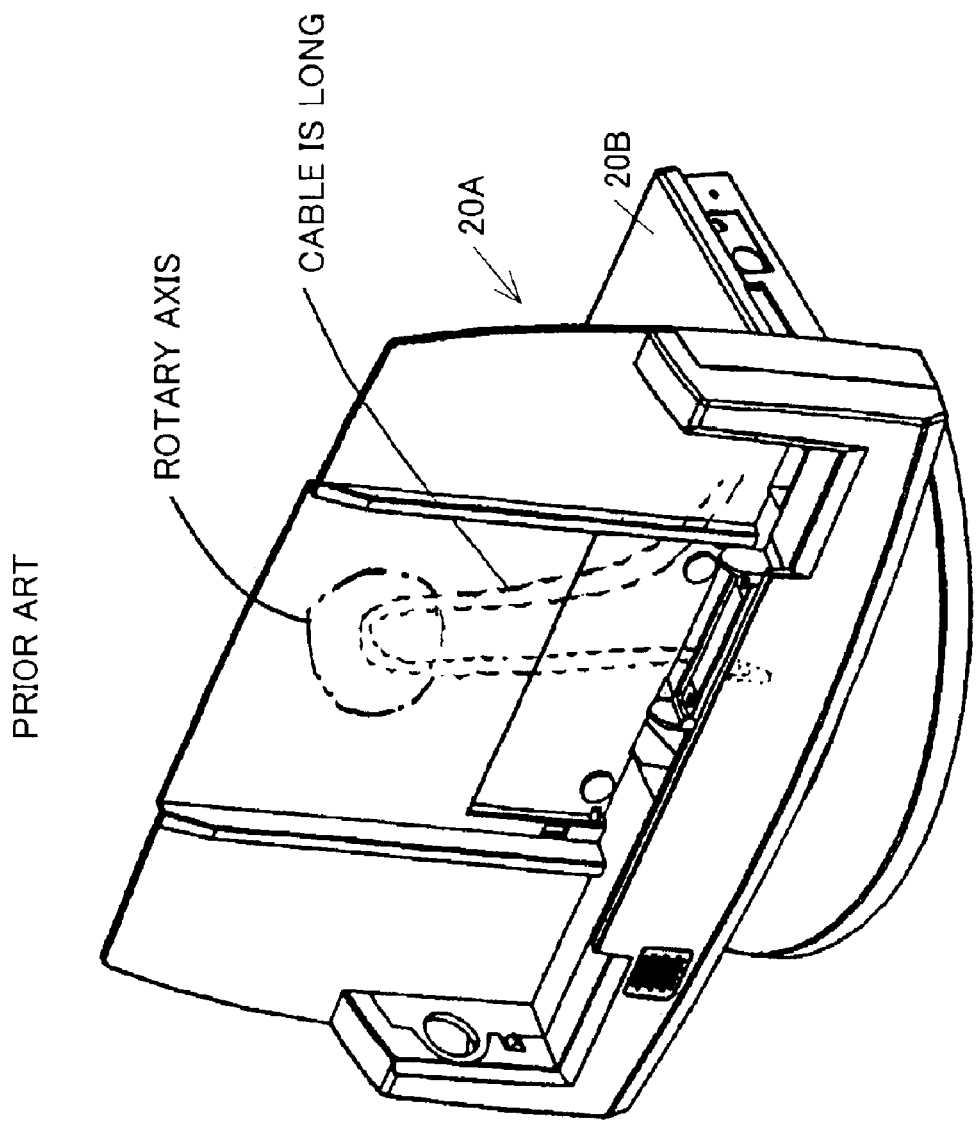
FIG. 23 is a perspective view for explaining problems if the conventional docking station is made rotatable.

Referring now to FIG. 21, a description will be given of the PC body 200. Here, FIG. 21 is a perspective overview showing the rear surface 204 of the PC body 200. The PC body 200 is a pen note type PC as a typical example of a portable electronic apparatus. However, the present invention does not limit the electronic apparatus to the pen note PC, and is applicable to a hand-held PC, a palm-sized PC, a wearable computer, other portable electronic apparatuses and portable terminals. In addition its size may cover a A4 size, a B5 size, a sub-notebook size, a mini-notebook size, etc. The PC body 200 includes a display 250 on the front surface 201, the LAN connector 240 on the side surface 202, and the battery part 230 on the bottom surface 206. However, this configuration is for merely exemplary purposes, and the PC body 200 may include a pen, a USB port, a radio communication antenna, an LED, an Ir receiver, a speaker, a power switch, a reset switch, a connector for an outer microphone, a connector for a headphone, an IrDA port, and an AC adapter terminal, although they are not illustrated. For example, a user uses the pen to input information into the PC body 200 through the display 250. These functions may apply any technology known in the art, and a description thereof will be omitted.

As shown in FIG. 21, the PC body 200 includes the rear surface 204, the connector 210, the pair of lock holes 212, the pair of positioning holes 214, 217A and 217B, the engagement hole 216, and the rubber leg 218. The PC body 200 is different from the conventional PC body 10 in that the connector 210 is formed at the center of the rear surface 204.

A description will be given of the attachment of the PC body 200.

Initially, a position of the guide 180 is adjusted depending upon a length of the battery part 230 in the PC body 200. If necessary, at this time, the desired orientation of the PC fixing part 120 is maintained by rotating the PC fixing part 120 in the direction $J_1$ or $J_2$ relative to the base 110.

Then, as shown in FIGS. 2 and 10, the PC fixing part 120 in the docking station 100 is arranged with the guide 180 down. Then, the bottom surface 206 on the PC body 200 is mounted on the mount part 181 of the guide 180, and the PC body 200 is attached to the docking station 100 by bringing the PC body 200 down around the body 206 toward the PC fixing part 120. Alternatively, as shown in FIGS. 14 and 15, the PC fixing part 120 on the docking station 100 is arranged with the side guide 150A down. Then, the PC body 200 is attached to the docking station 100 by bringing down the PC body 200 around the side surface 202 towards the PC fixing part 120.

The instant embodiment does not slide the PC body 200 on the docking station 100 unlike the conventional PC body 10, and thus the rear surface 204 of the PC body 200 is unlikely to be damaged. The attachment operation is easy because it requires the PC body 200 to be mounted on the PC fixing part 120 and fallen down. In particular, even if the PC fixing part 120 is arranged laterally as shown in FIGS. 14 and 15, the user may easily attach the PC body 200 to the PC fixing part 120. Such a feature results from the guides 180 and 150 that serve to position the PC body 200, as described with reference to the step 1002 in FIG. 17.

As discussed above, while the cable remains connected to the LAN connector 230 of the PC body 200, the PC body 200 cannot be attached to the PC fixing part 120 due to the collision with the side guide 150B. In this case, the user has to pull the cable from the LAN connector 230. Thereby, the network device, such as a hub, may be prevented from recognizing, as two computers, the PC body 200 connected as the docking station 100.

When the frame 140 is located at the lock position and the cable exposes, the provisional lock by the provisional lock 152 has been turned to the real lock, and the PC body 200 cannot be attached to the docking station 100. Thereby, the exposed cable is prevented from getting damaged due to the collision with the PC body 200.

Then, as described in the steps 1004 and 1006 in FIG. 17, the PC body 200 is positioned before the connectors 132 and 210 are connected to each other. The positioning bosses 190 and 191, positioning holes 214 and 217 in the PC body 200 position the PC body 200. The provisional lock 152 prevents vibrations of the PC body 200.

As described for the step 1008 in FIG. 17, the user moves the lock lever 141 after positioning, thereby moving the frame 140 from the unlock position to the lock position. As a result, as shown in FIGS. 9A, 9C and 9E, the engagement part 148 goes away from the engagement part 126, and the claw 160 is engaged with the engagement part 213 in the lock hole 212. In addition, as shown in FIGS. 5D and 5E, the provisional lock 152 turns the provisional lock to the real lock. As shown in FIGS. 8A to 8C, the engagement part 143 of the frame 140 is engaged with the engagement part 174, and the engagement member 170 locks, as shown in FIG. 8D, the frame 140 at the lock position. As described in the step 1010 in FIG. 17, the connector ascends and becomes connected to the connector 210 as shown in the left side to the right side in FIG. 3B. The connector 132 is connected to the connector 210 just after the frame 140 is locked at the lock position. Thus, since the positioning and lock of the PC body 200 ends before the connectors 132 and 210 are connected, connectors 132 and 210 are connected stably without incurring an overload.

Then, a user connects a mouse or keyboard to the PC body 200 that has been attached to the docking station 100, connects a FDD, USB, LAN, etc. to the PC body 200 to enter, edit and output information and expand a function of the PC body 200. If necessary, as shown in FIG. 19, the desired orientation of the PC fixing part 120 is maintained by rotating the PC fixing part 120 relative to the base 110 in the direction $J_1$ or $J_2$. Since an OS compatible with the rotation has been installed in the PC body 200, letters and images are automatically rotated by 90 degrees on the screen. As a result, a A4-sized manuscript, for example, may be displayed, as shown in FIG. 1A, on one screen by arranging the PC fixing part 120 vertically.

In order to separate the PC body 200 from the docking station 100, the reverse procedure is taken. First, a user presses the unlock button 172 to unlock the engagement part 143 that has been locked by the engagement part 174 from the state shown in FIG. 8C, and moves the lock lever 141 to move the frame 140 from the lock position to the unlock position. Thereby, the connector 132 moves from a right-side state to a left-side state in FIG. 3B. The provisional lock 152 transfers from the real lock state shown in FIG. 5E to the provisional state shown in FIG. 5B. In addition, a pair of claws 160 moves to the lock holes 213 so that an interval between them expands as shown in FIG. 9A, and is disengaged from the engagement part 213. In addition, the engagement part 148 is engaged with the engagement part 126.

Then, a user separates the PC body 200 from the PC fixing part 120. In separation, the user holds the top (i.e., the top surface or side surface) of the PC body 200 as shown in FIGS. 2 and 10 or FIGS. 14 and 15, and pulls it to the user's side. Thereby, the provisional lock 152 allows the PC body 200 to be separated, as shown in FIGS. 5D and 5C. The claw 160 is merely inserted into the lock hole 212, and does not prevent the PC body 200 from being separated.

Further, the present invention is not limited to these preferred embodiments, and various modifications and changes may be made in the present invention without departing from the spirit and scope thereof.

As discussed, one aspect of the present invention may provide a functional expansion apparatus that is adapted to rotate, provides an easy detachable attachment of an electronic apparatus to the functional expansion apparatus without damaging the electronic apparatus, and maintains a stable connection without damaging connectors in both apparatuses, as well as a method for attaching the electronic apparatus to the functional expansion apparatus. In addition, another aspect of the present invention may provide a functional expansion apparatus that enables the electronic apparatus to be used rotatably with a shorter cable.

What is claimed is:

1. A functional expansion apparatus for connecting an electronic apparatus having a first connector, to an external apparatus that expands a function of the electronic apparatus, said functional expansion apparatus comprising:
   a frame movable between a first position and a second position;
   a connector cover including a second connector connectible to the first connector, said connector cover moving with said frame so that the first and second connectors are connected to each other when said frame is located at the first position, and the first and second connectors are disconnected from each other when said frame is located at the second position; and
   a lock part that locks the electronic apparatus in a case where said frame is located at the first position, and for unlocking the electronic apparatus in a case where said frame is located at the second position;
   wherein said frame has a groove that moves said connector cover close to and apart from the electronic apparatus, and said connector cover has a projection that moves along the groove.

2. A functional expansion apparatus according to claim 1, wherein the electronic apparatus has a LAN connector, and said functional expansion apparatus further comprises a shield member that covers the LAN connector when the electronic apparatus is attached to said functional expansion apparatus.

3. A functional expansion apparatus for connecting an electronic apparatus having a first connector, to an external apparatus that expands a function of the electronic apparatus, said functional expansion apparatus comprising:
   a frame movable between a first position and a second position;
   a connector cover including a second connector connectible to the first connector, said connector cover moving with said frame so that the first and second connectors are connected to each other when said frame is located at the first position, and the first and second connectors are disconnected from each other when said frame is located at the second position; and
   a lock part that locks the electronic apparatus in a case where said frame is located at the first position, and for unlocking the electronic apparatus in a case where said frame is located at the second position;
   wherein the electronic apparatus has a LAN connector, and said functional expansion apparatus further comprises a shield member that covers the LAN connector when the electronic apparatus is attached to said functional expansion apparatus.

4. A functional expansion apparatus that connects an electronic apparatus having a first connector, to an external apparatus that expands a function of the electronic apparatus, said functional expansion apparatus comprising
   a base connectible with the external apparatus; and
   an electronic apparatus fixing part that is connectible to the electronic apparatus, and includes a second connector connectible to the first connector, said electronic apparatus fixing Part being coupled to said base rotatable around the second connector;
   wherein said electronic apparatus fixing part includes:
      a housing to which the electronic apparatus is attached;
      a stopper formed on said housing; and
      an approximately annular friction plate that is fixed onto said housing and has plural elastically deformable first projections, and
   wherein said base includes:
      a second projection that contacts the stopper and restricts a movement of the stopper, the second projection having a concave part engageable with the first projection; and
      a stand onto which the second projection is fixed, said stand being fixed rotatably onto the friction plate.

5. A functional expansion apparatus according to claim 4, wherein the friction plate has a hollow part, through which a cable that connects the second connector and the base to each other passes.

6. A function expansion apparatus according to claim 4, wherein the stopper includes three first stoppers that are annularly arranged at an interval of 120 degrees, and three second stoppers that are annularly arranged at an interval of 120 degrees, wherein the first and second stoppers are offset by 90 degrees.

7. A functional expansion apparatus that connects first and second electronic apparatus having different lengths, to an external apparatus that expands a function of the electronic apparatus, said functional expansion apparatus comprising:
   a guide, movable between first and second positions and used to mount and incline the electronic apparatus in an attempt to attach the electronic apparatus to the functional expansion apparatus, said guide guiding the first electronic apparatus when said guide is located at the first position, and guiding the second electronic apparatus when said guide is located at the second position; and
   a holding part that holds said guide at the first and second positions;
   wherein the first and second electronic apparatuses include different battery parts with different lengths.

* * * * *